(12) United States Patent
Imanilov et al.

(10) Patent No.: US 11,956,185 B2
(45) Date of Patent: Apr. 9, 2024

(54) TIME-DIVISION DUPLEXING (TDD) DETECTION IN WIRELESS DISTRIBUTED COMMUNICATIONS SYSTEMS (DCS) TO SYNCHRONIZE TDD DOWNLINK AND UPLINK COMMUNICATIONS, AND RELATED METHODS

(71) Applicant: Corning Research & Development Corporation, Corning, NY (US)

(72) Inventors: Benjamin Imanilov, Hod haSharon (IL); Guy Lupescu, Tel Aviv (IL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 310 days.

(21) Appl. No.: 17/231,663

(22) Filed: Apr. 15, 2021

(65) Prior Publication Data

US 2021/0328754 A1 Oct. 21, 2021

Related U.S. Application Data

(60) Provisional application No. 63/010,375, filed on Apr. 15, 2020.

(51) Int. Cl.
*H04L 5/14* (2006.01)
*H04B 17/336* (2015.01)
*H04W 56/00* (2009.01)

(52) U.S. Cl.
CPC ......... *H04L 5/1469* (2013.01); *H04B 17/336* (2015.01); *H04W 56/001* (2013.01)

(58) Field of Classification Search
None
See application file for complete search history.

(56) References Cited

U.S. PATENT DOCUMENTS

| | | | | |
|---|---|---|---|---|
| 2004/0246925 | A1* | 12/2004 | Wang | H04L 1/1819 370/332 |
| 2007/0025316 | A1* | 2/2007 | Yamasaki | H04W 24/00 370/346 |

(Continued)

*Primary Examiner* — Alex Skripnikov
*Assistant Examiner* — Pamit Kaur
(74) *Attorney, Agent, or Firm* — William D. Doyle

(57) ABSTRACT

Time-division duplexing (TDD) detection in wireless distributed communications systems (DCSs) to synchronize TDD downlink and uplink communications. Remote units in the wireless DCS include an adaptive TDD communications synchronization circuit that includes a power detection circuit configured to detect TDD communications signals distinguished from noise. The power detection circuit is configured to adaptively set a noise threshold floor level for TDD downlink communications link by detecting the noise level on the TDD downlink communications link that includes a TDD uplink communication period. The adaptive TDD communications synchronization circuit can also include a symbol edge detection circuit configured to generate an edge trigger signal indicating the symbol edges of TDD downlink communication signals. The symbol edge trigger is used by a TDD frame configuration build circuit to generate a TDD communications frame configuration to control switching of the downlink and uplink communications circuits for synchronizing TDD downlink and uplink communications.

26 Claims, 11 Drawing Sheets

(56) References Cited

U.S. PATENT DOCUMENTS

| | | | |
|---|---|---|---|
| 2008/0095223 A1* | 4/2008 | Tong | H04L 5/0057 375/228 |
| 2009/0092090 A1* | 4/2009 | Beems Hart | H04L 5/0091 370/329 |
| 2010/0041341 A1* | 2/2010 | Stratford | H04L 5/14 455/67.14 |
| 2014/0307591 A1* | 10/2014 | Wang | H04W 72/542 370/278 |
| 2017/0207871 A1 | 7/2017 | Shim et al. | |
| 2017/0279567 A1 | 9/2017 | Rahman et al. | |
| 2018/0020467 A1 | 1/2018 | Nouah et al. | |
| 2018/0263035 A1 | 9/2018 | Ben-Shlomo et al. | |
| 2018/0302210 A1 | 10/2018 | Hedin et al. | |
| 2018/0351633 A1 | 12/2018 | Birkmeir et al. | |
| 2019/0028187 A1 | 1/2019 | Gutman et al. | |
| 2019/0044675 A1 | 2/2019 | Li et al. | |
| 2019/0182021 A1 | 6/2019 | Shokri Razaghi et al. | |
| 2019/0182753 A1 | 6/2019 | Belleschi et al. | |
| 2019/0207739 A1 | 7/2019 | Aktas et al. | |
| 2019/0230662 A1 | 7/2019 | Ben-Shlomo et al. | |
| 2019/0261292 A1 | 8/2019 | Thomas | |
| 2020/0044728 A1 | 2/2020 | Birkmeir et al. | |
| 2020/0053669 A1 | 2/2020 | Hannan et al. | |
| 2020/0228217 A1 | 7/2020 | Ahn et al. | |
| 2020/0236676 A1 | 7/2020 | Ben-Shlomo et al. | |
| 2020/0259629 A1 | 8/2020 | Ovesjö et al. | |
| 2020/0313836 A1 | 10/2020 | Kang | |
| 2020/0343938 A1 | 10/2020 | Medina Acosta et al. | |
| 2020/0344619 A1 | 10/2020 | Gormley et al. | |
| 2021/0127375 A1 | 4/2021 | Hoglund et al. | |
| 2021/0306127 A1 | 9/2021 | Sundberg et al. | |
| 2021/0376992 A1 | 12/2021 | Lightstone et al. | |

\* cited by examiner

TIME-DIVISION DUPLEXING (TDD) DETECTION IN WIRELESS DISTRIBUTED COMMUNICATIONS SYSTEMS (DCS) TO SYNCHRONIZE TDD DOWNLINK AND UPLINK COMMUNICATIONS, AND RELATED METHODS

PRIORITY APPLICATION

The present application claims priority under 35 U.S.C. § 119(e) to U.S. Provisional Patent Application Ser. No. 63/010,375, filed on Apr. 15, 2020, and entitled "TDD DETECTION IN WIRELESS COMMUNICATIONS SYSTEMS (WCS)," the contents of which is incorporated herein by reference in its entirety.

BACKGROUND

The disclosure relates generally to a wireless communications apparatus(es), such as a remote unit(s), a remote radio head(s), or a mobile device(s), particularly in a wireless communications system (WCS), such as a distributed communications system (DCS), a small cell radio access network (RAN), or a distributed antenna system (DAS), configured to support radio time-division duplexing (TDD).

No admission is made that any reference cited herein constitutes prior art. Applicant expressly reserves the right to challenge the accuracy and pertinency of any cited documents.

Wireless customers are increasingly demanding wireless communications services, such as cellular communications services and Wireless Fidelity (Wi-Fi) services. Thus, small cells, and more recently, Wi-Fi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of DCSs as WCSs, such as a small cell RAN or DAS. DCSs include a central unit or node that is configured to transmit or distribute communications signals to remote units, typically over physical mediums, such as electrical conductors or optical fiber. The remote units are configured to receive and distribute such communications signals to client devices within the antenna range of the remote unit. DCSs can be particularly useful when deployed inside buildings or other indoor environments where the wireless communications devices may not otherwise be able to effectively receive radio frequency (RF) signals from a source.

In this regard, FIG. 1 illustrates a DCS 100 that is configured to distribute communications services to remote coverage areas 102(1)-102(N), where 'N' is the number of remote coverage areas. The DCS 100 in FIG. 1 is provided in the form of a wireless DCS, such as a DAS 104 in this example. The DAS 104 can be configured to support a variety of communications services that can include cellular communications services, wireless communications services, such as RF identification (RFID) tracking, Wi-Fi, local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on remote units 106(1)-106(N) connected to a central unit 108 (e.g., a head-end controller, a central unit, or a head-end unit). The central unit 108 may be communicatively coupled to a source transceiver 110, such as, for example, a base transceiver station (BTS) or a baseband unit (BBU). In this regard, the central unit 108 receives downlink communications signals 112D from the source transceiver 110 to be distributed to the remote units 106(1)-106(N). The downlink communications signals 112D can include data communications signals and/or communications signaling signals as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over the communications link 114. The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. The remote units 106(1)-106(N) may include RF transmitter/receiver circuits 116(1)-116(N) and antennas 118(1)-118(N), respectively. The antennas 118(1)-118(N) are operably connected to the RF transmitter/receiver circuits 116(1)-116(N) to wirelessly distribute the communications services to user equipment (UE) 120 within the respective remote coverage areas 102(1)-102(N). The remote units 106(1)-106(N) are also configured to receive uplink communications signals 112U from the UE 120 in the respective remote coverage areas 102(1)-102(N) to be distributed to the source transceiver 110.

Conventionally, the remote units 106(1)-106(N) may be configured to communicate the downlink communications signals 112D and the uplink communications signals 112U with the UE 120 based on a third-generation (3G) wireless communication technology, such as wideband code-division multiple access (WCDMA), and/or a fourth-generation (4G) wireless communication technology, such as long-term evolution (LTE). As wireless communication technology continues to evolve, a new fifth-generation (5G) new-radio (NR) (5G-NR) wireless communication technology has emerged as a next-generation wireless communication technology having the potential of achieving significant improvement in data throughput, coverage range, signal efficiency, and access latency over the existing 3G and 4G wireless communication technologies. As such, it may be necessary to upgrade or reconfigure the remote units 106(1)-106(N) to communicate the downlink communications signals 112D and the uplink communications signals 112U with the UE 120 based on the 5G-NR wireless communication technologies.

TDD can be employed in DCS 100 in FIG. 1 to separate downlink communications signals 112D from uplink communications signals 112U by transferring such signals in sequential synchronized radio frames. In TDD DCSs, a method is required to determine periods when downlink communications signals are being transmitted in a given time slot in a TDD frame and when uplink communications signals are being transmitted in a given time slot in the TDD frame. Transmitter and receiver circuits in such a TDD DCS are synchronized to these downlink communications signal and uplink communications signal periods so that downlink communications signals are not transmitted when uplink communications signals are present on the communications medium. In other words: the radio frame structure is known to TDD communications devices in the TDD distributed antenna system. Such TDD communications devices know when uplink communications messages can be sent and when uplink communications messages should not be sent to receive downlink communications signals. Otherwise, data losses can occur when downlink communications signals are not received when uplink communications signals are being transmitted. "Back-off" collision detection and avoidance systems can be employed to wait for a defined period of time until the communications medium is clear of uplink communications signals before asserting new downlink communications signals on the communications medium. However, throughput would be reduced to half-duplex as a result. Collision detection and management mechanisms may also add design complexity, thereby increasing cost by requiring additional components and requiring additional area on electronic boards.

The DCS 100 in FIG. 1 can be configured to support fourth-generation (4G) long-term evolution (LTE) communications signals and fifth-generation (5G) communications as examples. The DCS 100 can also be configured to support 4G and 5G communications in non-standalone (NSA) mode and 5G communications in standalone (SA) mode, as examples. In 4G NSA mode, LTE and 5G downlink and uplink communications need to be time-aligned to avoid downlink and uplink collisions. In 5G SA mode, 5G communications can be configured dynamically as either downlink or uplink communications signals not restricted by a static TDD frame configuration. Thus, in each exemplary case, a static TDD frame configuration (e.g., with a known frame period and downlink/uplink duty cycle) cannot be assumed to determine used the time periods or slots in a TDD frame when downlink communications transmissions and uplink communications transmissions are intended for TDD downlink and uplink synchronization. Further, TDD downlink reference (RS) signals cannot be specifically detected on the TDD downlink communications link without decoding the TDD downlink communications signals. Thus, in exemplary aspects disclosed herein, power on a downlink communications link in the DCS is detected to detect downlink RS signals communicated in the start of a TDD downlink communications time period to synchronize downlink and uplink communications in the DCS. However, it is not known if the downlink RS are detected at the start of the TDD downlink time period or if the downlink RS are detected shifted in time from the start of the TDD downlink time period. Further, the downlink RS may only consume a small portion of the downlink bandwidth in the TDD downlink time period when downlink data is not otherwise being transmitted. Thus, it may be difficult to determine the difference between noise on the TDD downlink communication link and the downlink RS.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings illustrate one or more embodiment(s), and together with the description, serve to explain principles and operation of the various embodiments.

SUMMARY

Embodiments disclosed herein include time-division duplexing (TDD) detection in wireless distributed communications systems (DCSs) to synchronize TDD downlink and uplink communications. Related systems and methods are also disclosed herein. As one non-limiting example, the wireless DCS may be a distributed antenna system (DAS). The wireless DCS can be a digital DCS that is configured to decode and/or process digital communications signals or an analog DCS that is configured to distribute communications signals as an analog radio-frequency (RF) signal. The wireless DCS can be configured to support 4G and 5G TDD communications in non-standalone (NSA) mode and 5G communications in standalone (SA) mode, as examples. In exemplary aspects, the wireless DCS includes one or more remote units that are each configured to detect power on a TDD downlink communications link to detect the TDD downlink time period in TDD communications controlled by a TDD signal source, such as a TDD base station. The detected TDD downlink time period is used to determine the TDD frame configuration and thus the TDD uplink time period to synchronize transmission and reception circuits for the transmission of TDD downlink communications signals and reception of TDD uplink communications signals through an antenna(s) at a remote unit. The remote unit is configured to detect TDD downlink synchronization that start at each frame beginning and/or reference signals (RS) that are transmitted in the beginning of a TDD downlink time period to recognize a TDD frame configuration pattern to determine the TDD communications frame used by the TDD signal source. The reference signal (RS) in a LTE TDD communications are distributed equally in frequency and in time in the TDD downlink period. Given that the TDD downlink reference signals may be allocated across the downlink channel spectrum, if no other downlink data is transmitted in a given TDD downlink time period, it is difficult to detect the difference between the TDD downlink reference signals and noise on the TDD downlink communications link. Further, it is not known if the detected energy on the TDD downlink communications link is at the start of the TDD downlink time period of the TDD communications frame, such that the TDD uplink time period can be determined for certain.

Thus, in exemplary aspects disclosed herein, the remote units in the wireless DCS include an adaptive TDD communications synchronization circuit. The adaptive TDD communications synchronization circuit includes a power detection circuit configured to detect power on a TDD downlink communications link configured to carry TDD downlink communications signals from a TDD base station or other TDD signal source. The power detection circuit determines if the power on the TDD downlink communications link exceeds a defined noise threshold floor level to distinguish TDD communications downlink signals from noise, including noise spikes, to detect the TDD downlink time period. Because noise levels can vary, the power detection circuit is configured to adaptively set the noise threshold floor level for TDD downlink communications link by detecting the noise level on the TDD downlink communications link over a defined TDD communication frame duration. The TDD communication frame period to use for detection can be based on a time sufficient to cover at least a portion of the TDD uplink communications period for a TDD communications frame, which may be known. The noise level can be determined to be the detected power on the TDD downlink communications link during the TDD uplink time period, which will appear as a lower power level during the detection period. The adaptive TDD communications synchronization circuit is configured to compare the detected power level on the TDD downlink communications link to the adaptively set noise threshold floor level for adaptively detecting the difference between noise and actual TDD downlink communications signals.

It is also desired to adaptively determine the start of the TDD downlink time period to update synchronization timing for synchronization of downlink and uplink communications circuits. This is difficult because the clock of the DCS can be different from the clock of a TDD signal source. Thus, symbol edge alignment and timing drift issues can prevent accurate synchronization. In this regard, the adaptive TDD communications synchronization circuit can also include a symbol edge detection circuit. The symbol edge detection circuit is configured to compare the received TDD downlink communications signal that exceed the noise threshold floor level to sampled signals received on the TDD downlink communications link. The symbol edge detection circuit is configured to count the sampled signals from on the TDD downlink communications link. The symbol edge detection circuit is configured to receive the TDD downlink communications that were determined by the power detection circuit as exceeding the noise threshold floor level. The symbol edge detection circuit is configured to determine the symbol edge of the TDD downlink communications signals based comparing the counted sampled signals and the detected TDD downlink communications signals to determine a symbol edge alignment for the TDD communication frame. The symbol edge detection circuit is configured to generate an edge trigger signal indicating the symbol edges of TDD downlink communication signals based on the determined symbol edge alignment between the counted sampled signals and the detected TDD downlink communications signals. The symbol edge trigger is used by a TDD frame configuration build circuit in the adaptive TDD communications synchronization circuit to build downlink and uplink markers that are adaptively adjusted based on the detected TDD downlink communication signals and the edge trigger signal to set a current TDD communications frame configuration. The TDD communications frame configuration is used to control the switching of the downlink and uplink communications circuits for synchronizing TDD downlink and uplink communications signals.

In one exemplary aspect, an adaptive TDD communications synchronization circuit is provided. The adaptive TDD communications synchronization circuit includes a power detector circuit. The power detection circuit is configured to receive a TDD downlink communications signal formatted for a TDD communication frame on a TDD downlink communications link. The power detection circuit is also configured to detect a noise signal level on the TDD downlink communications link over a defined duration of the TDD communication frame that includes a TDD uplink time period. The power detection circuit is also configured to set a noise threshold floor level for the TDD downlink communications link based on the detected noise signal level in the TDD uplink time period of the TDD communication frame. The power detection circuit is also configured to detect the TDD downlink communications signal exceeding the noise threshold floor level. The power detection circuit is also configured to detect the TDD downlink time period in the TDD communication frame based on the detect the TDD downlink communications signal exceeding the noise threshold floor level. The adaptive TDD communications synchronization circuit also includes a downlink/uplink switch circuit coupled to an input/output node. The downlink downlink/uplink switch circuit is configured to pass the detected TDD downlink communications signal to the input/output node during the detected TDD downlink time period.

In another exemplary aspect, a method of synchronizing TDD downlink and uplink communications in a DCS is provided. The method comprises receiving a TDD downlink communications signal formatted for a TDD communication frame on a TDD downlink communications link. The method also comprises detecting a noise signal level on the TDD downlink communications link over a defined duration of the TDD communication frame that includes a TDD uplink time period. The method also comprises setting a noise threshold floor level for the TDD downlink communications link based on the detected noise signal level in the TDD uplink time period of the TDD communication frame. The method also comprises detecting the TDD downlink communications signal exceeding the noise threshold floor level. The method also comprises detecting the TDD downlink time period in the TDD communication frame based on the detect the TDD downlink communications signal exceeding the noise threshold floor level. The method also comprises passing the detected TDD downlink communications signal exceeding the noise threshold floor level to an input/output node during the detected TDD downlink time period.

In another exemplary aspect, a DCS is provided. The DCS comprises a central unit configured to receive TDD downlink communications signals from a TDD signal source, distribute the received TDD downlink communications signals over at least one TDD downlink communications link to at least one remote unit among a plurality of remote units, receive TDD uplink communications signals over a plurality of TDD uplink communications links from the plurality of remote units, and distribute the received TDD uplink communications signals to TDD signal source. The plurality of remote units are each configured to receive the TDD downlink communications signals over a TDD downlink communications link among the at least one TDD downlink communications link, distribute the received TDD downlink communications signals to a user device, receive TDD uplink communications signals from a user device, and distribute the receive TDD uplink communications signals over a TDD uplink communications link among the plurality of TDD uplink communication to the central unit. At least one remote unit among the plurality of remote units includes an adaptive TDD communications synchronization circuit is provided. The adaptive TDD communications synchronization circuit includes a power detector circuit. The power detection circuit is configured to receive a TDD downlink communications signal formatted for a TDD communication frame on a TDD downlink communications link. The power detection circuit is also configured to detect a noise signal level on the TDD downlink communications link over a defined duration of the TDD communication frame that includes a TDD uplink time period. The power detection circuit is also configured to set a noise threshold floor level for the TDD downlink communications link based on the detected noise signal level in the TDD uplink time period of the TDD communication frame. The power detection circuit is also configured to detect the TDD downlink communications signal exceeding the noise threshold floor level. The power detection circuit is also configured to detect the TDD downlink time period in the TDD communication frame based on the detect the TDD downlink communications signal exceeding the noise threshold floor level. The adaptive TDD communications synchronization circuit also includes a downlink/uplink switch circuit coupled to an input/output node. The downlink downlink/uplink switch circuit is configured to pass the detected TDD downlink communications signal to the input/output node during the detected TDD downlink time period.

DETAILED DESCRIPTION

Figure 1:
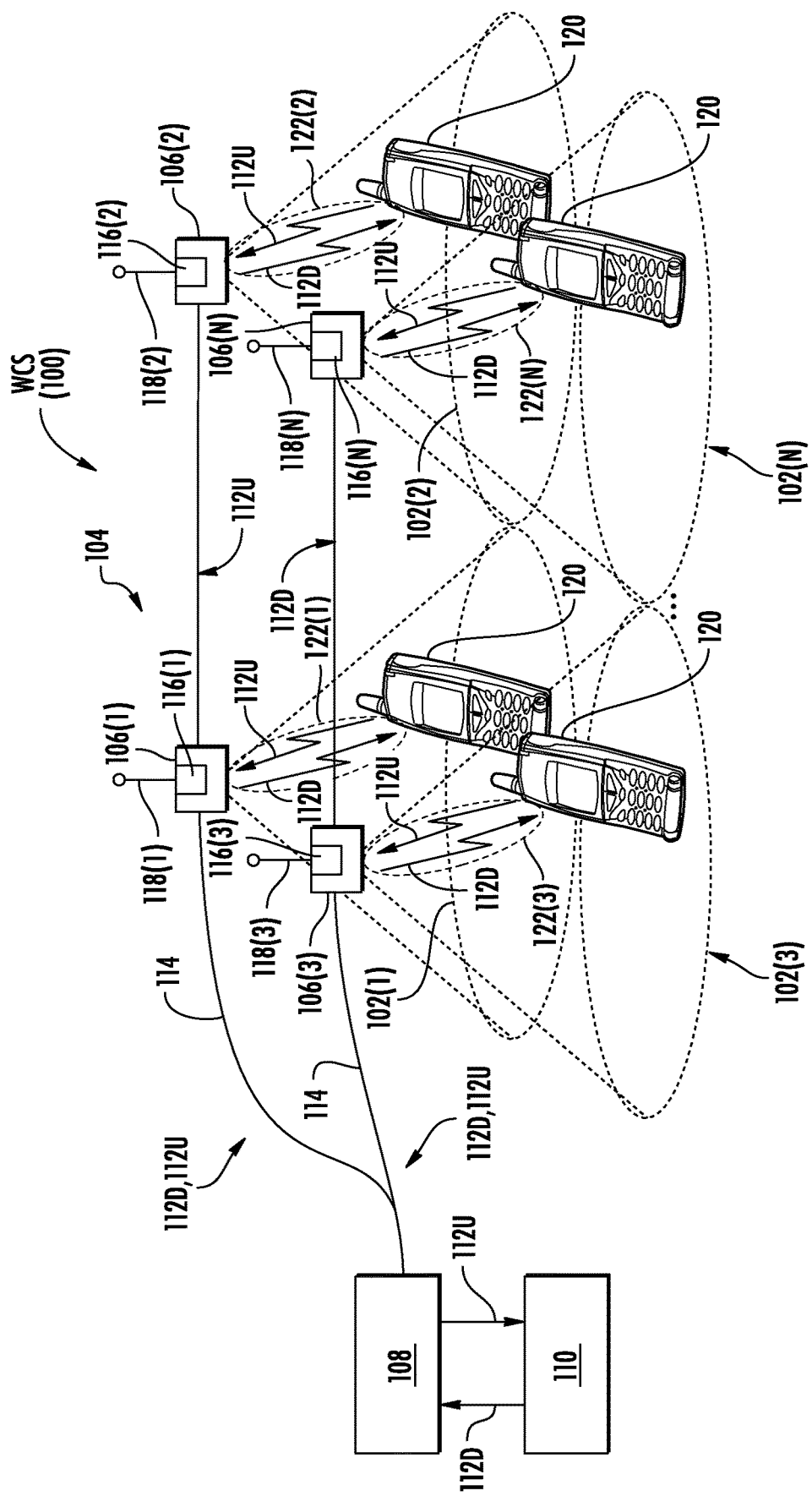
FIG. 1 is a schematic diagram of an exemplary wireless communications system (WCS), such as a distributed communications system (DCS), configured to distribute communications services to remote coverage areas.

Embodiments disclosed herein include time-division duplexing (TDD) detection in wireless distributed communications systems (DCSs) to synchronize TDD downlink and uplink communications. Related systems and methods are also disclosed herein. As one non-limiting example, the wireless DCS may be a distributed antenna system (DAS).

The wireless DCS can be a digital DCS that is configured to decode and/or process digital communications signals or an analog DCS that is configured to distribute communications signals as an analog radio-frequency (RF) signal. The wireless DCS can be configured to support 4G and 5G TDD communications in non-standalone (NSA) mode and 5G communications in standalone (SA) mode, as examples. In exemplary aspects, the wireless DCS includes one or more remote units that are each configured to detect power on a TDD downlink communications link to detect the TDD downlink time period in TDD communications controlled by a TDD signal source, such as a TDD base station. The detected TDD downlink time period is used to determine the TDD frame configuration and thus the TDD uplink time period to synchronize transmission and reception circuits for the transmission of TDD downlink communications signals and reception of TDD uplink communications signals through an antenna(s) at a remote unit. The remote unit is configured to detect TDD downlink synchronization that start at each frame beginning and/or reference signals (RS) that are transmitted in the beginning of a TDD downlink time period to recognize a TDD frame configuration pattern to determine the TDD communications frame used by the TDD signal source. The reference signal (RS) in an LTE TDD communication are distributed equally in frequency and in time in the TDD downlink period. Given that the TDD downlink reference signals may be allocated across the downlink channel spectrum (e.g., in 5G), if no other downlink data is transmitted in a given TDD downlink time period, it is difficult to detect the difference between the TDD downlink reference signals and noise on the TDD downlink communications link. Further, it is not known if the detected energy on the TDD downlink communications link is at the start of the TDD downlink time period of the TDD communications frame, such that the TDD uplink time period can be determined for certain.

Thus, in exemplary aspects disclosed herein, the remote units in the wireless DCS include an adaptive TDD communications synchronization circuit. The adaptive TDD communications synchronization circuit includes a power detection circuit configured to detect power on a TDD downlink communications link configured to carry TDD downlink communications signals from a TDD base station or other TDD signal source. The power detection circuit determines if the power on the TDD downlink communications link exceeds a defined noise threshold floor level to distinguish TDD communications downlink signals from noise, including noise spikes, to detect the TDD downlink time period. Because noise levels can vary, the power detection circuit is configured to adaptively set the noise threshold floor level for TDD downlink communications link by detecting the noise level on the TDD downlink communications link over a defined TDD communication frame duration. The TDD communication frame period to use for detection can be based on a time sufficient time to cover at least a portion of the TDD uplink communications period for a TDD communications frame, which may be known. The noise level can be determined to be the detected power on the TDD downlink communications link during the TDD uplink time period, which will appear as a lower power level during the detection period. The adaptive TDD communications synchronization circuit is configured to compare the detected power level on the TDD downlink communications link to the adaptively set noise threshold floor level for adaptively detecting the difference between noise and actual TDD downlink communications signals.

It is also desired to adaptively determine the start of the TDD downlink time period to update synchronization timing for synchronization of downlink and uplink communications circuits. This is difficult because the clock of the DCS can be different from the clock of a TDD signal source. Thus, symbol edge alignment and timing drift issues can prevent accurate synchronization. In this regard, the adaptive TDD communications synchronization circuit can also include a symbol edge detection circuit. The symbol edge detection circuit is configured to compare the received TDD downlink communications signal that exceeds the noise threshold floor level to sampled signals received on the TDD downlink communications link. The symbol edge detection circuit is configured to count the sampled signals from on the TDD downlink communications link. The symbol edge detection circuit is configured to receive the TDD downlink communications that were determined by the power detection circuit as exceeding the noise threshold floor level. The symbol edge detection circuit is configured to determine the symbol edge of the TDD downlink communications signals based comparing the counted sampled signals and the detected TDD downlink communications signals to determine a symbol edge alignment for the TDD communication frame. The symbol edge detection circuit is configured to generate an edge trigger signal indicating the symbol edges of TDD downlink communication signals based on the determined symbol edge alignment between the counted sampled signals and the detected TDD downlink communications signals. The symbol edge trigger is used by a TDD frame configuration build circuit in the adaptive TDD communications synchronization circuit to build downlink and uplink markers that are adaptively adjusted based on the detected TDD downlink communication signals and the edge trigger signal to set a current TDD communications frame configuration. The TDD communications frame configuration is used to control the switching of the downlink and uplink communications circuits for synchronizing TDD downlink and uplink communications signals.

Figure 2:
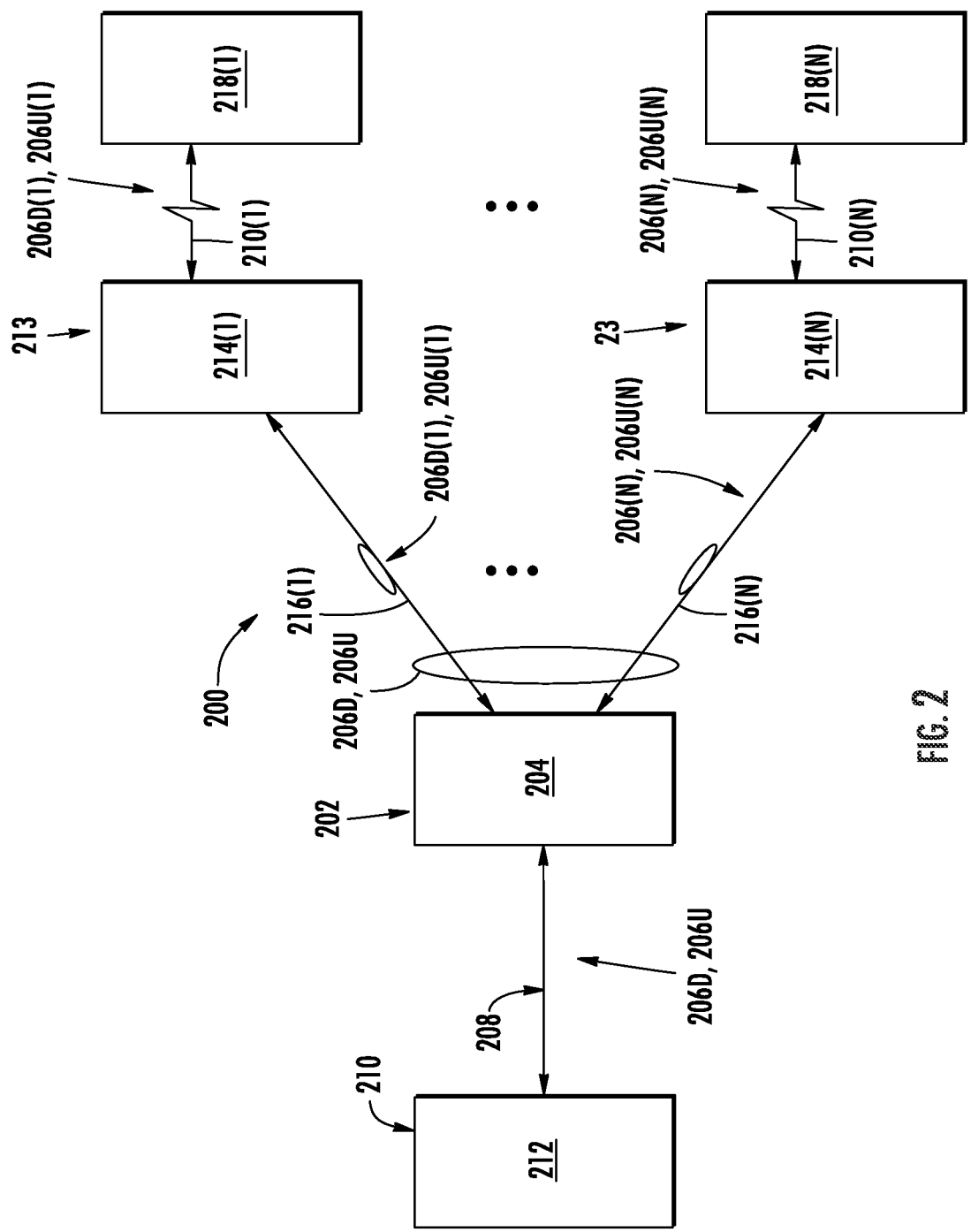
FIG. 2 is a schematic diagram of an exemplary point to multi-point time-division duplex (TDD) distributed antenna system employing TDD communications units in the form of a distributed antenna system (DAS) central unit configured to detect uplink/downlink TDD frame configurations in TDD communications signals from a TDD base station and synchronize uplink communications transmissions from the TDD communications units to the TDD base station.

FIG. 2 is a schematic diagram of exemplary TDD communications units configured to communicate TDD communications signals over a common communications medium where it is desired to avoid data loss. FIG. 2 illustrates an example of a DCS 200 as a non-limiting example of a system that includes TDD communications units in this embodiment. The DCS is thus also referred to herein as a "TDD DCS 200." The TDD DCS 200 includes first TDD communications unit 202 in the form of a central unit 204. The central unit 2094 may also be referred to as a head-end unit (HEU) or head-end equipment (HEE). The central unit 204 could also be a TDD communications repeater as another example. The central unit 204 is configured to receive downlink TDD communications signals 206D over a communications medium 208 from second TDD communications units 210 in the form of a TDD base station 212. The central unit 204 distributes the received downlink TDD communications signals 2061) to one or more of a plurality of remote units 214(1)-214(N) in the TDD DCS 200 in a point-to-multipoint configuration in this example. The central unit 204 is coupled to third TDD communications units 213 provided in the form of a plurality remote units 214(1)-214(N) with a dedicated communications medium 216(1)-216(N) in a point-to-multipoint configuration.

With continuing reference to FIG. 2, the central unit 204 is also configured to receive uplink TDD communications signals 206U from the remote units 214(1)-214(N). The remote units 214(1)-214(N) are remote antenna units in this embodiment that can wirelessly receive the uplink TDD communications signals 206U from one or more client devices 218(1)-218(Q). The client devices 218(1)-218(Q) and the remote units 214(1)-214(N) may be configured to communicate wirelessly with each other or over physical communications links 220(1)-220(N), or both. The central unit 204 transmits the received uplink TDD communications signals 206U from the remote units 214(1)-214(N) over the communications medium 18 to the TDD base station 22. The TDD DCS 200 may be provided in an outdoor or an indoor environment.

With continuing reference to FIG. 2, the communications medium 208 communicatively coupling the central unit 204 to the TDD base station 212 is a common communications medium in this example. In other words, the communications medium 208 carries both the downlink TDD communications signals 206D and the uplink TDD communications signals 206U between the TDD base station 212 and the central unit 204. As a non-limiting example, the communications medium 208 may be an electrical coaxial cable, twisted-pair wiring (e.g., CAT5/6/7), or other communications medium. To avoid data loss of downlink TDD communications signals 206D, the communications medium 208 is provided with a TDD duplex communications link. The downlink TDD communications signals 206D are separated from the uplink TDD communications signals 206U by the allocation of different time slots in the same frequency band. If the downlink TDD communications signals 206D and the uplink TDD communications signals 206U were communicated in the same time slots over the communications medium 208, data loss of the downlink TDD communications signals 206D would occur. The TDD communications units, namely the central unit 204 and the remote units 214(1)-214(N), may transmit uplink TDD communications signals 16U when downlink TDD communications signals 206D are being communicated to these units.

Thus, it is desired to provide for the central unit 204 and remote units 24(1)-24(N) to not transmit the uplink TDD communications signals 206U in a time slot in which the downlink TDD communications signals 206D are being transmitted by the TDD base station 212. However, the protocol of the particular TDD communications services may not include a marker or other indicia in a TDD communications frame that provides a known, guaranteed transition between a downlink communications period and an uplink communications period. One example of such a TDD communications service that may be supported by the TDD DCS 200 in FIG. 2 is Long Term Evolution (LTE) TDD. In LTE TDD, the uplink/downlink frame TDD frame configuration of the TDD communications signals from a TDD base station can be detected to synchronize uplink communications. In LTE, the beginning of the DL frame period always has specific symbols that are present. These symbols can be detected to determine the uplink/downlink frame TDD frame configuration. The detected uplink/downlink TDD frame configuration in the downlink TDD communications signals can be used to determine the time periods or slots in the TDD frame when downlink communications transmissions are intended, and uplink communications transmissions are intended. In this manner, TDI) communications units in the distributed antenna system can synchronize transmission circuitry transmitting uplink TDD communications signals in a different time period(s) or slot(s) from reception of downlink TDD communications signals from the TDD base station to avoid or reduce data loss.

However, in 5G TDD communications, a Non-Stand Alone (NSA) operational mode for TDD requires that LTE and 5G base stations be time-aligned from transmission and receiving periods. Moreover, in 5G Stand Alone (SA) mode of TDD, but in case of LTE TDD presence in adjacent channel and/or in the same band, 5G TDD schedule should not violate LTE TDD. In other words, there are many scenarios where it is desired to avoid 5G transmission downlink during LTE uplink, including fully NA operational mode. The case of having 5G TDD only in a band that is not restricted by LTE TDD scheduling, assuming knowledge of frame configuration, is more challenging. This is because there is introduction of some resources that can be decided dynamically as downlink or uplink. There is no real-time signaling and/or triggering provided from base station to the TDD DCS in this scenario, but only static or semi-static frame format configuration is known. In other words, detecting a static downlink/uplink frame configuration cannot inform flexible radio resource utilization to determine downlink and uplink time periods for DL and UL transmissions. Further, if no downlink data is being transmitted, the downlink reference symbols transmitted in a downlink period of a TDD communication frame may only consume a few MegaHertz (MHz) of bandwidth thus making it difficult to use power detection to detect the downlink reference symbols due to noise that may be present in the communications signal.

The DCS 200 in FIG. 2 can be configured to support fourth-generation (4G) long-term evolution (LTE) communications signals and fifth-generation (5G) communications as examples. The DCS 100 can also be configured to support 4G and 5G communications in non-standalone (NSA) mode and 5G communications in standalone (SA) mode, as examples. In 4G NSA mode, LTE and 5G downlink and uplink communications need to be time-aligned to avoid downlink and uplink collisions. In 5G SA mode, 5G communications can be configured dynamically as either downlink or uplink communications signals not restricted by a static TDD frame configuration. Thus, in each exemplary case, a static TDD frame configuration (e.g., with a known frame period and downlink/uplink duty cycle) cannot be assumed to determine used the time periods or slots in a TDD frame when downlink communications transmissions and uplink communications transmissions are intended for TDD downlink and uplink synchronization. Further, TDD downlink reference (RS) signals cannot be specifically detected on the MD downlink communications link without decoding the TDD downlink communications signals. Thus, in exemplary aspects disclosed herein, power on a downlink communications link in the DCS is detected to detect downlink RS signals communicated in the start of a TDD downlink communications time period to synchronize downlink and uplink communications in the DCS. However, it is not known if the downlink RS are detected at the start of the TDD downlink time period or if the downlink RS are detected shifted in time from the start of the TDD downlink time period. Further, the downlink RS may only consume a small portion of the downlink bandwidth in the TDD downlink time period when downlink data is not otherwise being transmitted. Thus, it may be difficult to determine the difference between noise on the TDD downlink communication link and the downlink RS.

For example, in contrast to LTE TDD frame configuration, where Reference Signals (RS) are transmitted during TDD downlink communications at constant locations in time and frequency domain, such "fillers" do not exist in the case of 5G TDD communications. The reference signals are attached to the TDD downlink transmission sequence, for example, the Demodulation Reference Signal (DMRS) instead of common LTE RS. Therefore, almost no TDD downlink transmission is expected in 5G before detecting TDD uplink communications signals. The Synchronization Signal Block (SSB) of 5G TDD communications are transmitted periodically, including before TDD uplink communications signals are available. However, the SSB can have a different location and occupation width relatively to TDD frame beginning that can change dynamically or semi-dynamically, i.e., the information is not included in frame format configuration that known in the DCS.

Figure 3:
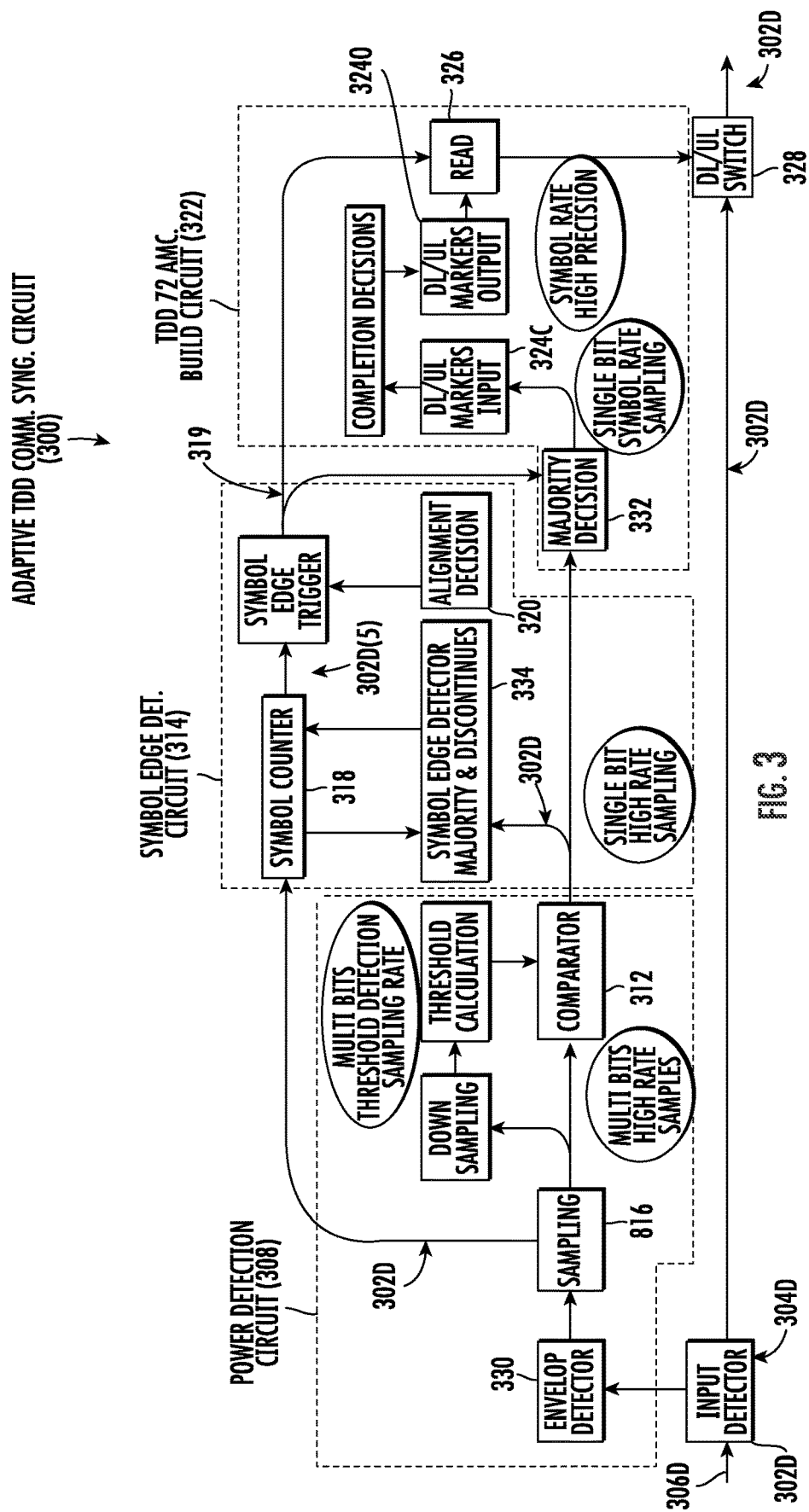
FIG. 3 illustrates an exemplary adaptive TDD communications synchronization circuit that can be provided in a remote unit of a DCS, according to an embodiment, to adaptively determine a TDD frame configuration of TDD communications signals communicated by a TDD signal source, to control TDD downlink and uplink communications circuits to synchronize TDD downlink and uplink communications in the DCS.

In this regard, FIG. 3 illustrates an exemplary adaptive TDD communications synchronization circuit 300 that can be provided in a remote unit of a DCS, such as a remote unit 214(1)-214(N) in the DCS 200 in FIG. 2. As will be discussed in more detail below, the adaptive TDD communications synchronization circuit 300 is configured to adaptively determine a TDD frame configuration of TDD communications signals communicated by a TDD signal source, such as a TDD base station. The adaptive TDD communications synchronization circuit 300 is configured to control TDD downlink and uplink communications circuits in a DCS to synchronize TDD downlink and uplink communications in the DCS.

In this regard, with reference to FIG. 3, the adaptive TDD communications synchronization circuit 300 includes a downlink communications input 302D that is configured to receive TDD downlink communication signals 304D. The TDD downlink communication signals 304D are received on the downlink communications input 302D over a TDD downlink communications link 306D. The TDD downlink communication signals 304D may be communicated according to a frame configuration and TDD communications frame according to a 4G or 5G communications protocol, as examples. The adaptive TDD communications synchronization circuit 300 is configured to adaptively determine a TDD frame configuration used to communicate the TDD downlink communication signals 304D based on analyzing the TDD downlink communication signals 304D. For example, the adaptive TDD communications synchronization circuit 300 starts the detection of the TDD frame configuration after the TDD signal source starts communicating the TDD downlink communication signals 304D and before the full information regarding the TDD frame configuration is known.

As will be discussed in more detail below, the adaptive TDD communications synchronization circuit 300 includes a power detection circuit 308 configured to detect power on the TDD downlink communications link 306D configured to carry TDD downlink communications signals 302D from a TDD base station or other TDD signal source. The power detection circuit 308 determines if the power on the TDD downlink communications link 306D exceeds a defined noise threshold floor level to distinguish TDD communications downlink signals from noise, including noise spikes, to detect the TDD downlink time period. Because noise levels can vary, the power detection circuit 308 includes a threshold calculation circuit 310 that is configured to adaptively set the noise threshold floor level for TDD downlink communications link by detecting the noise level on the TDD downlink communications link 306D over a defined TDD communication frame duration. The TDD communication frame period to use for detection can be based on a time sufficient time to cover at least a portion of the TDD uplink communications period for a TDD communications frame, which may be known. The noise level can be determined to be the detected power on the TDD downlink communications link 306D during the TDD uplink time period, which will appear as a lower power level during the detection period. The power detection circuit 308 includes a comparator circuit 312 that is configured to compare the detected power level on the TDD downlink communications link 306D to the adaptively set noise threshold floor level for adaptively detecting the difference between noise and actual TDD downlink communications signals.

With continuing reference to FIG. 3, it is also desired that the adaptive TDD communications synchronization circuit 300 adaptively determine the start of the TDD downlink time period to update synchronization timing for synchronization of downlink and uplink communications circuits in a WDS. This is difficult because the clock of the DCS can be different from the clock of a TDD signal source. Thus, symbol edge alignment and timing drift issues can prevent accurate synchronization. In addition to described uncertainty of DL/UL timing detection, there is challenge of DL/UL switch timing when having different clock sources for BS and DAS, that actually is the more realistic situation vs having shared clock source, especially in case of multiple operators neutral host DAS. In case of LTE TDD communications, there are 5 or 10 milliseconds periodicity to have the TDD downlink communications signal at the same location relatively to frame start, i.e., any LTE BS of any TDD signal source vendor will transmit the same fixed pattern given specific TDD frame format configuration. The fine time alignment synchronization of TDD downlink and uplink communications in a DCS can be updated at 5 or 10 milliseconds (ms) period according to first TDD downlink communications symbol in a TDD frame. The possible negative impact of residual miss alignment is relative to Cyclic Prefix (CP) duration that is proportional to TDD symbol duration.

In case of 5G TDD, the appearance of any TDD downlink transmission, such as SSB, for example, can be with periodicity of up to 16 ms. Moreover, if no TDD uplink communications signals are detected on a TDD uplink communications link by a TDD signal source, and for example, there was an initial SSB periodicity of 10 ms, it can be increased to longer non-transmission period up to 160 ms. In other words, even in case, the frame format is according to 5 or 10 ms of TDD downlink/uplink scheduling, it is not guaranteed to have TDD downlink communications signals with this periodicity. In addition, the SSB signal start/duration and format can be also managed dynamically in range of several TDD communications symbols. Therefore, pattern detection for 5G TDD communications and time drift (caused by different clock sources between a DCS and a TDD communications source) compensation may not be able to be done with methods as described above. In the case of 5G TDD communications, the TDD downlink/uplink scheduling is defined strictly by static configuration in addition to special flexible allocation to be defined in dynamically or semi-dynamically as TDD downlink or uplink.

In this regard, to provide TDD downlink symbol detection and alignment for TDD downlink/uplink synchronization, the adaptive TDD communications synchronization circuit 300 in this example also includes a symbol edge detection circuit 314. The symbol edge detection circuit 310 is configured to compare the received TDD downlink communications signal 302D that exceeds the noise threshold floor level to sampled signals 302D(S) sampled by a sampling circuit 316 in the power detection circuit 308 received on the TDD downlink communications link 306D. The symbol edge detection circuit 300 includes a symbol counter circuit 318 that is configured to count the symbols of the sampled signals 302D(S). The symbol edge detection circuit 314 is configured to receive the TDD downlink communications signals 302D that were determined by the power detection circuit 308 to exceed the noise threshold floor level. The symbol edge detection circuit 314 is configured determine the symbol edge of the TDD downlink communications signals 302D based comparing the counted sampled signals 302D(S) and the detected TDD downlink communications signals 302D to determine an symbol edge alignment for the TDD communication frame. The symbol edge detection circuit 314 is configured to generate an edge trigger signal 319 indicating the symbol edges of TDD downlink communication signals 302D based on the determined symbol edge alignment by an alignment decision circuit 320 between the counted sampled signals 302D(S) and the detected TDD downlink communications signals 302D. The symbol edge trigger 319 is used by a TDD frame configuration build circuit 322 in the adaptive TDD communications synchronization circuit 300 to build input and output downlink and uplink markers 324I, 324O that are adaptively adjusted based on the detected TDD downlink communication signals 302D and the edge trigger signal 319 to set a current TDD communications frame configuration to a read circuit 326. The read circuit 326 controls the switching of the downlink and uplink communications circuits, including a DL/UL switch circuit 328 for synchronizing TDD downlink and uplink communications.

More detail regarding the example adaptive TDD communications synchronization circuit 300 in FIG. 3 will now be described.

Referring to FIG. 3, the power detection circuit 308 includes an envelope detection circuit 330 that can be implemented as a root-mean-squared (RMS) estimator circuit. The power detection circuit 308 is configured to sample the signals 302D on the TDD downlink communications link 306D and use the envelop detector circuit 330 to convert the power envelop of such signals 302D to a binary sequence. The assumed downlink energy presence on the TDD downlink communications link 306D is denoted by "1" in the sampled TDD downlink communications signals 302D output by the sample circuit 316, and missing downlink energy (meaning a candidate of TDD uplink time period, but can be also a TDD downlink time period that is not allocated/used in specific TDD frame) is denoted by "0" sampled TDD downlink communications signals 302D output by the sample circuit 316. The sampling rate of the sampling circuit 316 can be higher than the TDD communications symbols rate. For example, to comply with 5G TDD requirements of 10 nanosecond (ns) transition time between TDD downlink time period to the TDD uplink time period, and vice versa, it is desired to have a sampling rate equal or higher than 100 Msps for accurate TDD OFDM symbol edge detection that is used to define TDD frame edge also.

An approach to starting DCS operation as quickly as possible is to remember the location of TDD downlink energy presence inside a TDD frame duration period. Therefore, at least from the next TDD frame and on, the detected duration time of TDD downlink energy will be defined as a TDD downlink time period and open for transmission, including for TDD frames when this radio resource was not used for TDD downlink transmission by the TDD signal source. This approach may be defined as "max hold" because for any location inside the periodic TDD frame, it is decided according to maximum energy that will appear in any of previous TDD frames marking this time period as TDD downlink communications signals allocated.

The "max hold" approach procedure can be defined by below rules:
Initialization
a. Whole frame duration is defined as UL. DAS is operating accordingly, such as by transporting to BS signal during whole frame duration as UL signal.
b. Threshold to be used for conversion from power envelope to binary sequence is defined. The binary sequence is representing frame duration period from TDD downlink energy presence point of view.
Frame Processing
  Given binary sequence of DL energy presence:
  a. OFDM symbol edge defined.
  b. Detected TDD downlink duration is marked as TDD downlink from next TDD frame and so on.

An advantage of the "max hold" approach is simplicity and early starting of DCS service. One possible disadvantage is a delay by frame in TDD downlink transmission for specific location in a TDD frame period. Another is a lack of robustness for clock drift caused by using different clock sources at BS and DAS. The max hold approach, according to the present embodiments, is made effective, and in that, it provided a solution for adaptive threshold used for converting power envelope to binary sequence.

As described above, the signal power level detection of the TDD downlink communications signals 302D is difficult for 5G TDD relatively to LTE TDD case because of dynamic behavior and energy efficiency utilized in 5G TDD. Therefore, a threshold for power envelope can be defined to be relative only to noise floor when the estimated power envelope is converted to binary sequence of TDD downlink/uplink markers. In other words, given noise floor estimation, it is possible to set the threshold above noise floor, for example, 10 dB higher in case the EVM of TDD signal source is significantly better—equivalent to Tx SNR>10 dB.

In case of analog DCS, a power estimator in the envelope detector circuit 330 implemented in analog domain by RF modules can be used, however, the envelope detector circuit 330 output will be sampled according to a TDD frame duration to be processed in digital domain for both tasks: to set the threshold and to convert power envelope to binary sequence of TDD downlink/uplink markers. In case of digital DCS, the envelope detector circuit 330 can be done by equivalent digital module. The sampling rate by the sampling circuit 316 for threshold adaptation purposes can be significantly lower than sampling to handle TDD downlink energy presence to detect OFDM symbol edge. Therefore, the envelope detector circuit 330 used for adaptive threshold mechanism can have longer response and, accordingly, better averaging properties.

In case of implementation restrictions to have single envelope detector circuit 330, an approach according to the present embodiments is sampling by the sampling circuit 316 with a high sampling rate (to be used for high precision OFDM symbol edge detection) and down sampling it to lower sampling rate for adaptive threshold determination. Power level is not expected to change during OFDM symbol duration, therefore, down sampling can be performed by low pass filter followed by outputting single value for each 1/[rate reduction ratio] output samples. The low pass filter can be substituted by median filter or max hold sliding window, etc. For all above options, the working rate of adaptive threshold mechanism should be at least twice relatively to OFDM symbols rate.

Complexity is reduced by sampling the TDD downlink communications signal 302D in the sampling circuit 316 in lower rate relatively to twice symbols rate, moreover, complexity is also reduced by excluding low pass filter from the processing chain, that is, outputs are taken periodically, ignoring all power estimator outputs in between. Aliasing is not avoidable, however, as will be explained later, threshold adaptation can be based on measurement of noise floor only. The method is to pick RMS estimations and consider only maximal values of full length or partial sequences resolve the alising, however, providing the solution only statistically.

For simplicity, the sampled output of the envelope detector circuit 330 is defined in a logarithmic scale, with dBm values sampled. In additional to different sampling rates, another difference between sampling process for threshold determination and binary sequence generation is that for threshold sampling is with multiple bits and/or levels mechanism to have non-binary value, and for binary sequence, obviously, there is single bit sampling according to comparison with threshold value.

The desirable time of noise floor measurement is the TDD uplink time period, where no TDD downlink communications signals 302D are transmitted by TDD signal source. Thus, the noise floor level can be estimated at connection to antenna port of TDD signal source. Having samples for TDD frame duration does not guarantee alignment with the frame beginning, therefore, the TDD uplink period start location is not known.

After switching on the 5G TDD signal source, most of the TDD downlink slots of the TDD frame will be without transmission of TDD downlink communications data. Therefore, a method of noise floor estimation could be done at arbitrary position. But depending on TDD signal source implementation, at least in case of analog interface between TDD signal source and a DCS, there can be difference between noise floor during the TDD downlink time period and the TDD uplink time period. In case an RF and/or intermediate frequency and/or baseband amplification chain is active during TDD downlink time periods, even when nothing to transmit, the noise floor there can be higher relatively to TDD signal source in receiving TDD uplink time period. The noise introduced at input of DCS can include not only AWGN thermal noise but also to have impact from TDD signal source imperfection and/or interconnection imperfections that could cause to "noise spikes"—observed as temporal energy increase during TDD uplink or downlink non-transmitting time.

It is desired to keep the noise floor and the "noise spike" below a given threshold when spacing above "spike power level" can be set according to specific equipment imperfections. The only information known at DCS is the TDD frame format configuration. Therefore, durations of TDD uplink time period and guard times are known, but not the starting location inside the sampled TDD frame. According to the present example, it is proposed to run a circular sliding window maximum search, followed by choosing location where the smallest maximum was found.

Definitions: N is defined by the number of samples s_n available for TDD frame duration for threshold definition purpose. M is defined by the number of samples representing duration of TDD uplink time period and guard times together. The procedure of threshold value determination is as follows:

Find local maximum of all options of M samples sequence including circular:

Local max$(k)$=max$(s_n)$, $k \leq n \leq$ mod$(k+M,N)$, $0 \leq k \leq N-1$

Find minimum among local maximums and define threshold D dB above:

Threshold=$D$+min(Local max$(k)$), $0 \leq k \leq N-1$

The process of threshold calculation can be performed by the threshold calculation circuit 310 each TDD frame duration to introduce adaptivity to changing noise floor and/or appearance/disappearance of "noise spikes," etc. In addition to adaptivity advantage, robustness is improved by reducing false TDD downlink communications detection probability when noise floor is rising or "noise spikes" appears in the silence TDD uplink time period and guard times. The adaptive threshold determination of TDD downlink communications may be independent process from other features described herein.

According to another aspect, B is defined by the number of TDD OFDM symbols in 10 ms—it is in inverse ratio to Sub-Carriers Spacing (SCS). For example, for SCS=15 kHz, the number of OFDM symbols is 140, but for SCS=60 kHz, B=560. The 10 ms observation period is used, for example, simplicity only, there is no restriction to have any other duration according to flexibility of 5G TDD frame duration. There are additional TDD frame durations in 5G (in LTE, there are two option 5 and 10 milliseconds) that are different from 10 ms. For explanation simplicity here and below is referred to a exemplary case of 10 ms duration.

To manage the decision regarding marking an OFDM symbol as TDD downlink communications, it is represented by a binary vector of length equal to B, used as a pattern map of TDD downlink/uplink. Therefore, denoting by R the sampling rate that is advised according to OFDM symbol edge detection, there are R*10e-3 samples per 10 milliseconds that should be down sampled to B samples only for DL/UL mapping. For example, if R=122.88 Msps and B=560, the down sampling rate should be approximately 2,194, converting 1,228,800 samples to 560 DL/UL mapping marker bits.

Note, in 5G (as in LTE), in case of normal CP, duration of symbols is not the same for all symbols. Continuing the example of SCS=60 kHz, B=560, there are 20 symbols of 2,256 samples and 540 symbols of 2,192 samples in 10 milliseconds. The 20 longer symbols are equally spread in the frame, so we know relative positions, but without alignment to frame beginning, the exact location is not known.

The difference between regular and longer OFDM is depicted by the symbol by $\Delta$. R=122.88 Msps, SCS=60 kHz, B=560 the example: $\Delta$=2,256−2,192=64. Generally, there is one long symbol in 0.5 milliseconds, i.e., 20 long symbols in 10 milliseconds. In this example, one long symbol is followed by 27 regular symbols.

Before exact TD frame location knowledge, it is not known where is the long and where is the regular TDD symbol is located. One of options is to assume an average length, another is arbitrary decision that the long OFDM symbol starts when we have switched on the DAS. Regarding the second "arbitrary" decision, it is equivalent to assumption of frame location knowledge, however, with high probability, it will be wrong.

According to an embodiment, the "max hold" approach may be enhanced by introduction of OFDM symbol edge detection by the symbol edge detection circuit 314 combined with clock drift compensation. A counter "C" is incremented for each TDD communications signal sample of sampling rate R and running R*10e-3 ticks during frame duration of 10 milliseconds. For above example it will run from [0] to [1,228,800−1] before reset to [0] again. 560 OFDM symbols of our example are counted by this counter as below:

20*2,256+(560−20)*2,192=1,228,800

Assuming arbitrary that the first long symbols starts at counter C=$C_0$=0, starts of all OFDM symbols can be defined as $C_i$, according to mapping long symbol followed by several regular and so on. In above example, after a long OFDM symbol, there are 27 regulars and define $C_i$ for $0 \leq i < 560$. Having different SCS and B there will be different positions of symbols starting, so that different number of regular OFDM symbols are between long OFDM symbols, but the mechanism of mapping is the same.

According to one aspect, down sampling procedure from R*10e-3 samples to B samples is performed according to majority vote. This procedure can eliminate false decisions made by comparison with threshold in presence of short energy increase that is not sourced in DL transmission by the TDD signal source. The majority vote can be controlled by [majority percentage] parameter, for example if it equal to 50%, in case of more than half of 2,192 samples are 1's, the decision for binary sequence will be 1 in according location. Majority percentage is set depending on equipment connected to DCS (TDD signal source, repeater, convertor, etc.) so that according to implementation imperfections and interference behavior of specific devices, it can be 75%, for example, but for explanation simplicity, a majority percentage as 50% can be assumed. The counting for majority test decision is starting according to known C_i positions, i.e. the majority examination for binary downlink/uplink marker starts at 〚C=C〛_i for marker #i.

A process can be performed for OFDM symbol edge determination by the symbol edge detection circuit 314. The majority vote for OFDM edge detection in a symbol edge detector majority circuit 334 described for conversion from high sampling rate of power envelope single bit samplings can be used for medium rate of binary sequence of TDD downlink/uplink markers for robustness against noise spikes. The negative impact of false OFDM symbol edge detection is higher than for false binary sequence decision because falsely decided edge followed by compensation shift can be followed by change of whole TDD downlink/uplink mapping. On the other hand, missing opportunities of OFDM symbol edge detection (miss detection) most probably will not lead to any negative impact in case it happens in moderate probability. Therefore, the [edge detection majority] parameters proposed to be higher than [majority percentage] used for generation of binary sequence of TDD downlink/uplink markers. In addition, to have more protection against OFDM symbol edge false detection, one solution is to dismiss cases where long non-interrupted sequences of "0's" found during potential OFDM symbol.

Figure 4:
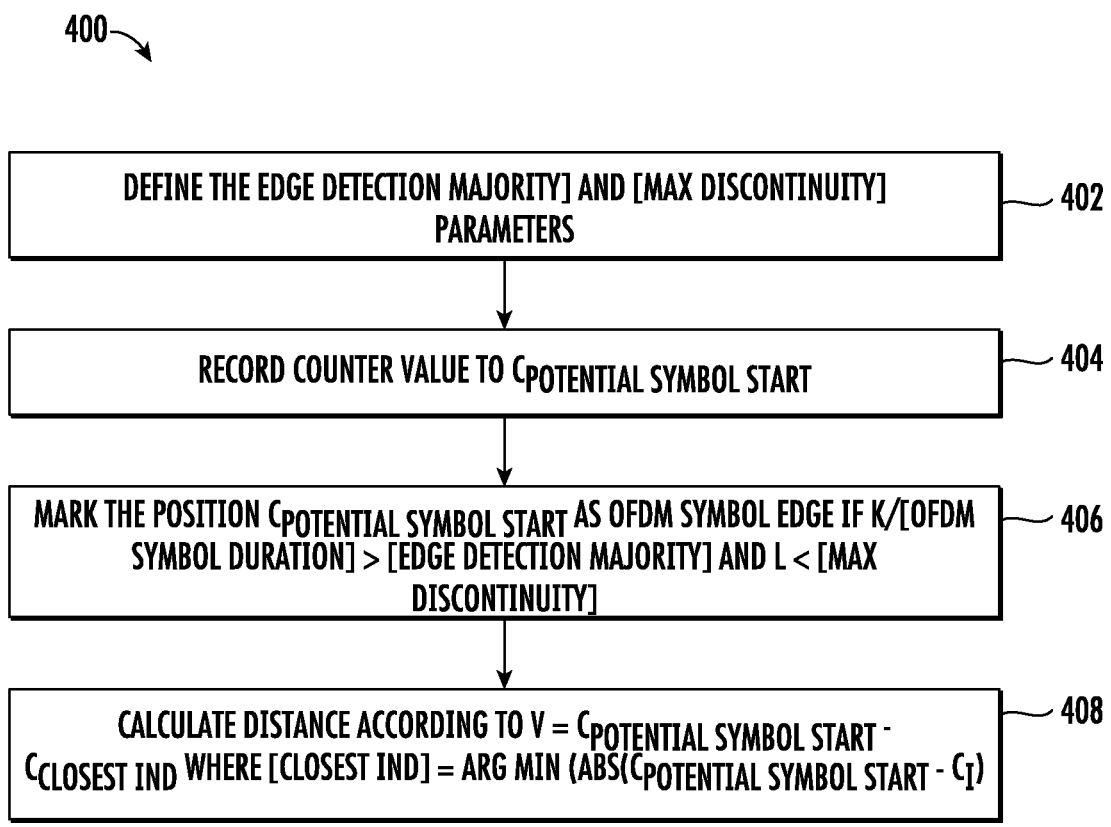
FIG. 4 is a flowchart illustrating an exemplary TDD communications symbol edge detection process that can be employed by a symbol edge detection circuit in the adaptive TDD communications synchronization circuit in FIG. 3 to detect the symbol edge of downlink TDD communications signals, according to an embodiment.

FIG. 4 is a flowchart illustrating an exemplary TDD communications symbol edge detection process 400 that can be employed by a symbol edge detection circuit 314 in the adaptive TDD communications synchronization circuit 300 in FIG. 3 to detect the symbol edge of downlink TDD communications signals. In this regard, a first step can be to define the edge detection majority] and [max discontinuity] parameters (block 402 in FIG. 4). At detection of "0" to "1" transition in the sampled signals 302D(s) in high rate samplings by the sampling circuit 316, the symbol counter circuit 318 can be configured to record counter value to $C_{potential\ symbol\ start}$ (block 404 in FIG. 4). The symbol edge detector majority circuit 334 performs statistics observations for OFDM symbol duration. Observation starts at $C_{potential\ symbol\ start}$ and ends at $C_{potential\ symbol\ end}$. The symbol counter circuit 318 records the total number of "1's" during the observation period to K and records maximal length of non-interrupted sequence of "0's" to L. The symbol edge detector majority circuit 334 marks the position $C_{potential\ symbol\ start}$ as OFDM symbol edge if K/[OFDM symbol duration]>[edge detection majority] and L<[max discontinuity] (block 406 in FIG. 4). symbol edge detector majority circuit 334 record distance between approved $C_{potential\ symbol\ start}$ and closest OFDM symbol start position $C_i$. The distance is calculated according to $$v = C_{potential\ symbol\ start} - C_{closest\ ind} \text{ where}$$
$$[closest\ ind] = \underset{i}{\mathrm{argmin}}(\mathrm{abs}(C_{potential\ symbol\ start} - C_i))$$

(block 408 in FIG. 4).

Correction of timing with periodicity of TDD frame duration for can be effected to: align according to found OFDM symbol edges and compensate clock drift. The decision of compensation should be taken before C=max (C)−(1+[OFDM symbol duration]/2). In the previous example C=1,228,800−(1+2,256/2)=1,227,671. V is denoted by a list of values recorded at step 4 in above procedure description when length of this list is equal to number of approved OFDM symbol edges. The values of list V are in range of +−[OFDM symbol duration]/2 according to definition of the closest OFDM symbol start.

One value decision will be available regarding alignment and drift compensation; therefore, all values of V should be aggregated to one value. There are many strategies to aggregate, one of possible options is averaging, another is calculating median. One approach can be to aggregate all values from the list, but aggregating only part values is also an option. For example, only last values can be used. Another option is to exclude most outstanding values from the list before aggregation. For generality, the process of generating single value v of from a list of values V is denoted as aggregation.

As mentioned previously, the position of TDD frame starting is not known, therefore before detection it, it is not known what edge belongs to a long TDD symbol and what belongs to a regular TDD symbol. Therefore, alignment to actual value of v can create undesired jittering decisions from TDD frame to TDD frame. One option to resolve this issue is to ignore any misalignment v that less than difference between long and regular OFDM symbols duration. This can be followed by removing "ignoring" restriction after detecting the TDD frame start. However, averaging/smoothing intra and inter-frame techniques can be used instead of the ignoring or in coordination with it.

Figure 5:
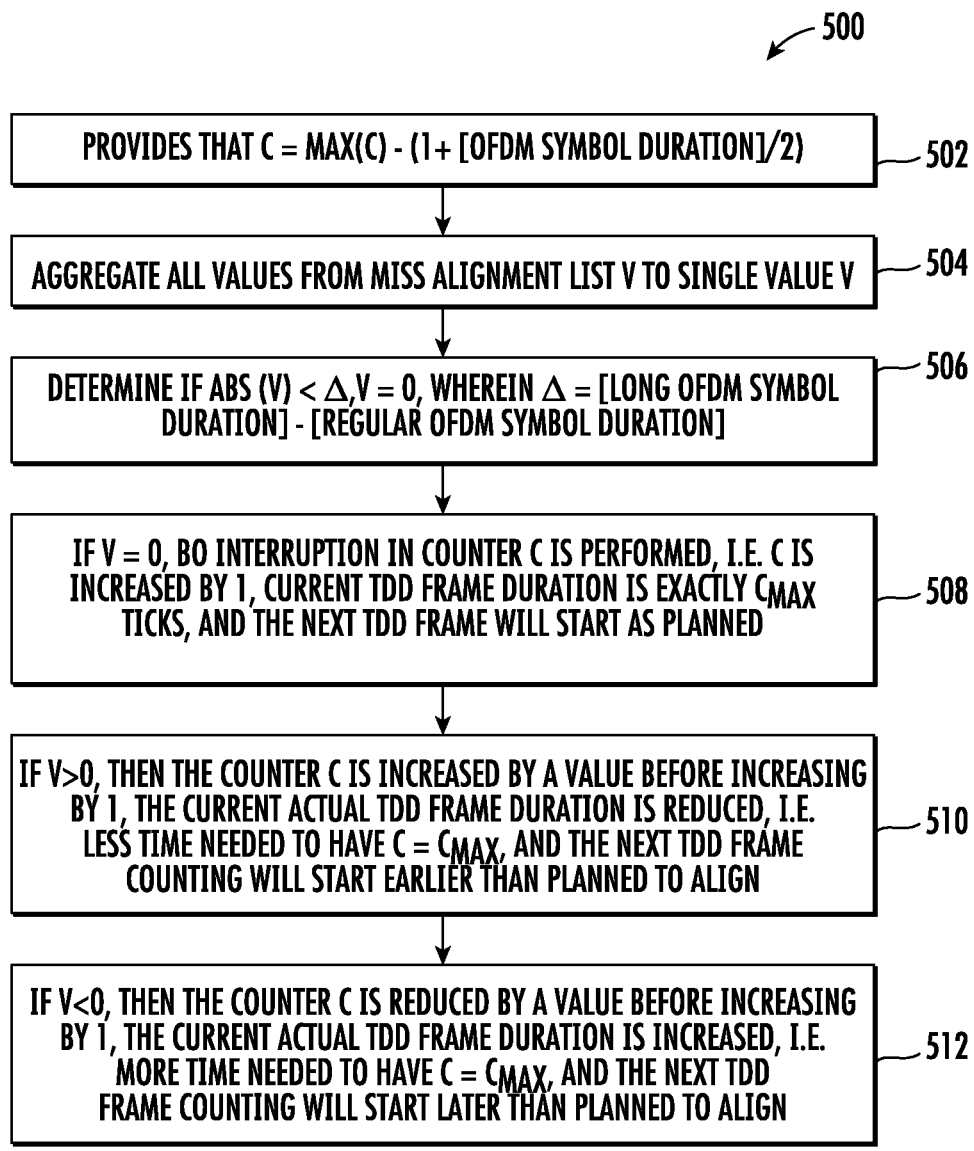
FIG. 5 is a flowchart illustrating an exemplary TDD communications symbol edge alignment process to generate an edge trigger signal indicating the symbol edges of TDD downlink communication signals in the adaptive TDD communications synchronization circuit in FIG. 3, according to an embodiment.

As discussed above, the symbol edge detection circuit 314 also includes an alignment circuit 320 to resolve any clock drift impact in the detection of TDD symbols. In this regard, FIG. 5 is a flowchart illustrating an exemplary TDD communications symbol edge alignment process 500 that can be performed to generate the TDD edge trigger signal 319, indicating the symbol edges of TDD downlink communication signals in the adaptive TDD communications synchronization circuit 300 in FIG. 3. This alignment procedure, that address also clock drifting impact, is described as follows. As illustrated in FIG. 5, assuming Assumption of having list V of miss alignment at counter tick, the alignment circuit 320 provides that C=max(C)−(1+[OFDM symbol duration]/2) (block 502 in FIG. 5). The alignment circuit 320 aggregate all values from miss alignment list V to single value v (block 504 in FIG. 5). The alignment circuit 320 determines if abs(v)<Δ, v=0, wherein Δ=[Long OFDM symbol duration]−[Regular OFDM symbol duration] (block 506 in FIG. 5). The alignment circuit 320 next tick value at counter C relatively to current value ($C_{current}$=max(C)−(1+[OFDM symbol duration]/2; $C_{next}=C_{current}+1+v$). According to this procedure, if v=0, Bo interruption in counter C is performed, i.e., C is increased by 1, current TDD frame duration is exactly $C_{max}$ ticks and the next TDD frame will start as planned (block 508 in FIG. 5). If v>0, then the counter C is increased by a value before increasing by 1, the current actual TDD frame duration is reduced, i.e., less time needed to have C=$C_{max}$ And the next TDD frame counting will start earlier than planned to align (block 510 in FIG. 5). If v<0, then the counter C is reduced by a value before increasing by 1, the current actual TDD frame duration is increased, i.e., more time needed to have C=$C_{max}$ And the next TDD frame counting will start later than planned to align (block 512 in FIG. 5).

For DCSs where internal clock is controllable, the observed v value or V lists of several frames can be used to calculate and correct the clock rate.

For example, assume we have measured the same number of v ticks for several frames, that can be translated to x=v/R seconds, where R is sampling rate. Denoting by τ the duration of frame in seconds, we can say that inaccuracy of the clock is:

$$\frac{x}{\tau} = \frac{v/R}{\tau} = \frac{v}{R \times \tau}$$

Therefore, the clock frequency can be corrected according to:

$$f_{corrected} = \left(1 + \frac{v}{R \times \tau}\right) \times f_{clock}$$

Described the overall solution, the binary sequence of TDD downlink/uplink markers that built according to all previously procedures are the controlling sequence for switching between TDD downlink transmission and receiving TDD uplink transmission in the DL/UL switch circuit 328. The DL/UL switch circuit 328 is set according the markers, therefore, minimal time between ON/OFF and OFF/ON switching is equal to OFDM frame duration. However, the precise timing to perform switch between downlink and uplink in the DL/UL switch circuit 328 according to the binary markers is controlled by the fastest sampling rate that is used for OFDM symbol edge detection and alignment. In other words, the process of retrieving new binary TDD downlink/uplink marker is according to counter values $C_i$, that denotes start of OFDM symbols, i.e., having precision as maximal sampling rate of system, but next DL/UL switch circuit 328 option is after OFDM symbol duration at next $C_{i+1}$.

According to another aspect, a completion procedure is proposed to accelerate detection of OFDM symbols allocated for TDD downlink and determine the frame starting knowledge followed by alignment to TDD frame timing. Moreover, in parallel to the acceleration by completion procedure, an additional level of protection is proposed against wrong decisions due to noise, interference, clock drift, etc . . . , that are not prevented by adaptive threshold and/or by OFDM symbol edge alignment and/or by majority test during conversion to binary sequence of TDD downlink/uplink markers.

The completion procedure is based on knowledge of the TDD frame format configuration or knowledge of TDD uplink time period+guard time duration. To have the completion procedure, an internal memory of binary sequence of TDD downlink/uplink markers to be also used for DL/UL switch circuit 328 command denoted as $B_{output}$ and $B_{input}$ to denote the new data produced by down sampling of last frame samplings. The DL/UL switch circuit 328 is performed according to reading values from $B_{output}$ at counter values $C=C_i$, where $C_i$ is start of OFDM symbol i.

Figure 6:
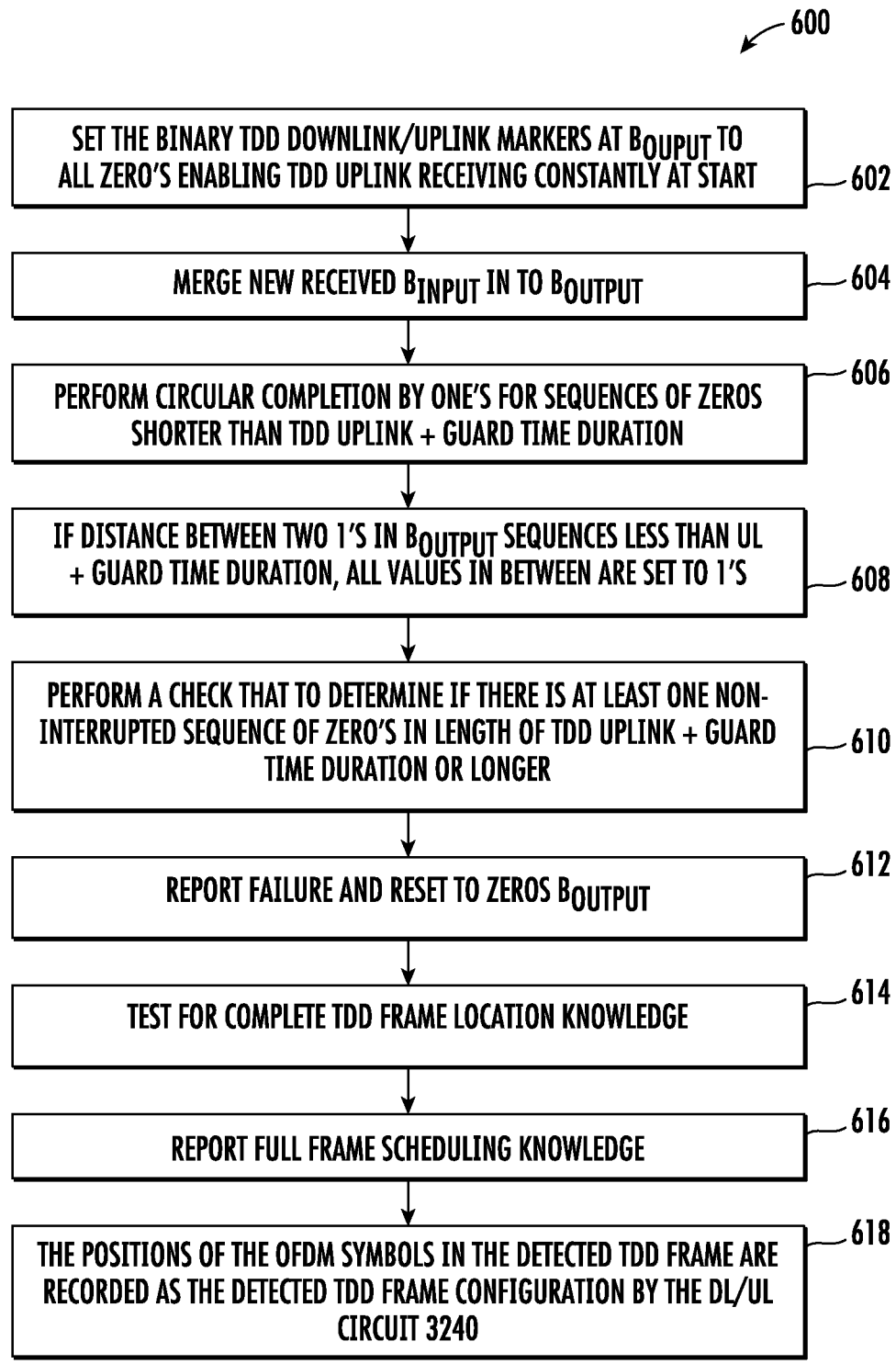
FIG. 6 is a flowchart illustrating an exemplary TDD frame configuration build process to build downlink and uplink markers in the adaptive TDD communications synchronization circuit in FIG. 3 based on the detected TDD downlink communication signals and the edge trigger signal to set a current TDD communications frame configuration to control the switching of the downlink and uplink communications circuits for synchronizing TDD downlink and uplink communications signals, according to an embodiment.

In this regard, FIG. 6 is a flowchart illustrating an exemplary TDD frame configuration build process 600 that can be performed by the TDD frame configuration build circuit 322 to build TDD downlink/uplink markers in the adaptive TDD communications synchronization circuit in FIG. 3 based on the detected TDD downlink communication signals and the edge trigger signal to set a current TDD communications frame configuration to control the switching of the downlink and uplink communications circuits for synchronizing TDD downlink and uplink communications signal. The TDD frame configuration build circuit 322 can calculate length of "0's" binary sequence of TDD downlink/uplink markers to represent TDD uplink time period+guard time according to known frame format. In this regard, as illustrated in FIG. 6, the DL/UL marker input circuit 324I is configured to set the binary TDD downlink/uplink markers at $B_{output}$ to all zero's enabling TDD uplink receiving constantly at start (block 602 in FIG. 6). The DL/UL marker input circuit 324I is also configured to merge new received $B_{input}$ in to $B_{output}$ (block 604 in FIG. 6). Merging is equivalent to binary OR operation: $B_{output}=B_{output}||B_{input}$. The DL/UL marker input circuit 324I is also configured to perform circular completion by one's for sequences of zeros shorter than TDD uplink+ Guard Time duration (block 606 in FIG. 6). If distance between two 1's in $B_{output}$ sequences less than UL+Guard Time duration, all values in between are set to 1's (block 608 in FIG. 6). Circularity equivalent to counting from beginning of $B_{output}$ in case end of $B_{output}$ reached. The DL/UL marker input circuit 324I is also configured to perform a check that to determine if there is at least one non-interrupted sequence of zeroes in length of TDD uplink+Guard Time duration or longer (block 610 in FIG. 6). If not, DL/UL marker input circuit 324I is also configured to report failure and reset to zeros $B_{output}$ (block 612 in FIG. 6). The DL/UL marker input circuit 324I is also configured to test for complete TDD frame location knowledge (block 614 in FIG. 6). If there is only one zero's sequence with length equal to TDD uplink+Guard Time duration, the DL/UL marker input circuit 324I is configured report full-frame scheduling knowledge (block 616 in FIG. 6). In this case, the positions of the OFDM symbols in the detected TDD frame are recorded as the detected TDD frame configuration by the DL/UL circuit 324O (block 618 in FIG. 6) to use to control the downlink and uplink switching of the DL/UL switch circuit 328.

In case positions of long TDD symbols are known, due to test ion block 614 in FIG. 6, the majority vote in the majority decision circuit 332 for generation of binary sequence DL/UL markers can be more accurate, i.e., counting exact number of samples in a symbol.

In case positions of long symbols are known, due to test of step (4), the time alignment can be more accurate, i.e., remove the restriction of ignoring small values of estimated miss alignment.

Figure 7:
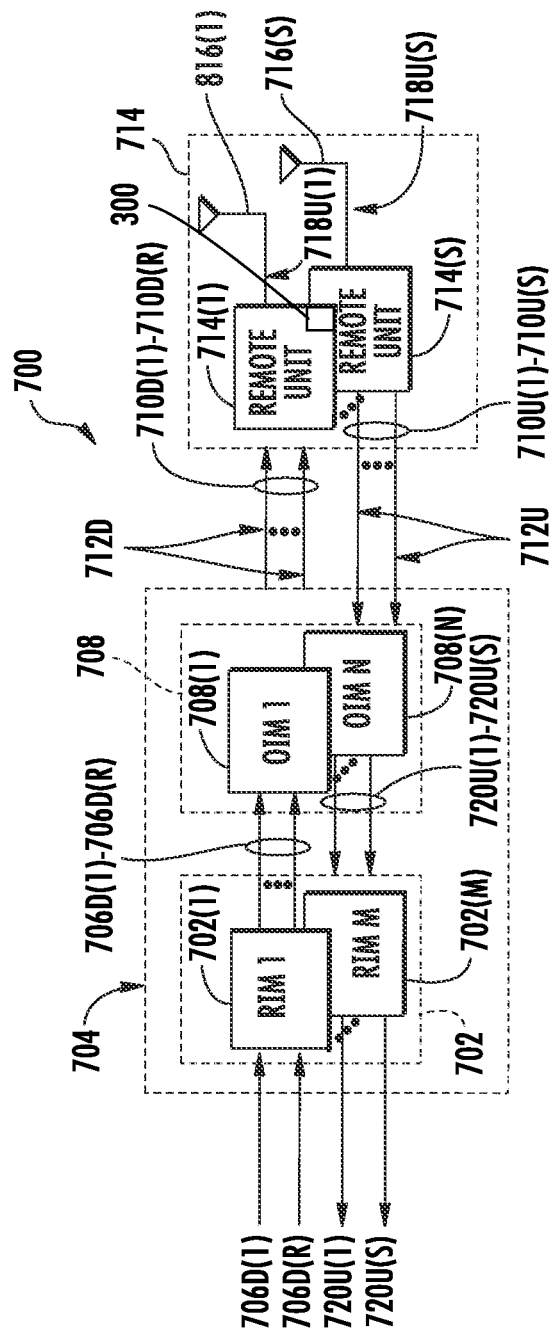
FIG. 7 is a schematic diagram of an exemplary WCS provided in the form of an optical fiber-based DAS that includes remote units configured to include the adaptive TDD communications synchronization circuit of FIG. 3 according to an embodiment.

FIG. 7 is a schematic diagram an exemplary WCS 700 provided in the form of an optical fiber-based WDS that can include a central unit to support TDD according to the present embodiments and a plurality of remote units that can include an adaptive TDD synchronization communications circuit, according to any of the embodiments herein, including but not limited to FIGS. 2-6. The WCS 700 includes an optical fiber for distributing communications services for multiple frequency bands. The WCS 700 in this example is comprised of three (3) main components. A plurality of radio interfaces provided in the form of radio interface modules (RIMs) 702(1)-702(M) are provided in a central unit 704 to receive and process a plurality of downlink digital communications signals 706D(1)-706D(R) prior to optical conversion into downlink optical fiber-based communications signals. The downlink digital communications signals 706D (1)-706D(R) may be received from a base station or a baseband unit as an example. The RIMs 702(1)-702(M) provide both downlink and uplink interfaces for signal processing. The notations "1-R" and "1-M" indicate that any number of the referenced component, 1-R, and 1-M, respectively, may be provided. The central unit 704 is configured to accept the RIMS 702(1)-702(M) as modular components that can easily be installed and removed or replaced in the central unit 704. In one example, the central unit 704 is configured to support up to twelve (12) RIMs 702(1)-702 (12). Each of the RIMS 702(1)-702(M) can be designed to support a particular type of radio source or range of radio sources (i.e., frequencies) to provide flexibility in configuring the central unit 704 and the WCS 700 to support the desired radio sources.

For example, one RIM 702 may be configured to support the Personalized Communications System (PCS) radio band. Another RIM 702 may be configured to support the 700 megahertz (MHz) radio band. In this example, by inclusion of the RIMS 702(1)-702(M), the central unit 704 could be configured to support and distribute communications signals on both PCS and Long-Term Evolution (LTE) 700 radio bands, as an example. The RIMs 702(1)-702(M) may be provided in the central unit 704 that support any frequency bands desired, including, but not limited to, the US Cellular band, PCS band, Advanced Wireless Service (AWS) band, 700 MHz band, Global System for Mobile communications (GSM) 900, GSM 1700, and Universal Mobile Telecommunications System (UMTS). The RIMS 702(1)-702(M) may also be provided in the central unit 704 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 702(1)-702(M) may be provided in the central unit 704 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 3, the downlink digital communications signals 706D(1)-706D(R) are provided to a plurality of optical interfaces provided in the form of optical interface modules (OIMs) 708(1)-708(N) in this embodiment to convert the downlink digital communications signals 706D(1)-706D(R) into a plurality of downlink optical fiber-based communications signals 710D(1)-710D(R). The notation "1-N" indicates that any number of the referenced component 1-N may be provided. The OIMs 708(1)-708(N) may be configured to provide a plurality of optical interface components (OICs) that contain optical-to-electrical (O/E) and electrical-to-optical (E/O) converters, as will be described in more detail below. The OIMs 708(1)-708(N) support the radio bands that can be provided by the RIMs 702(1)-702(M), including the examples previously described above.

The OIMs 708(1)-708(N) each include E/O converters to convert the downlink digital communications signals 706D(1)-706D(R) into the downlink optical fiber-based communications signals 710D(1)-710D(R). The downlink optical fiber-based communications signals 710D(1)-710D(R) are communicated over a downlink optical fiber-based communications medium 712D to a plurality of remote units 714(1)-714(S). Any of the remote units can include an adaptive TDD communications synchronization circuit, including the TDD communications synchronization circuit 300 in FIG. 3 to control the synchronization of TDD communications signals. At least one selected remote unit 714 among the remote units 714(1)-714(S) can be configured to support TDD according to the present embodiments. The notation "1-S" indicates that any number of the referenced component 1-S may be provided. Remote unit O/E converters provided in the remote units 714(1)-714(S) convert the downlink optical fiber-based communications signals 710D(1)-710D(R) back into the downlink digital communications signals 706D(1)-706D(R), which are then converted into a plurality of downlink RF communications signals and provided to antennas 716(1)-716(S) in the remote units 714(1)-714(S) to client devices in the reception range of the antennas 716(1)-716(S).

The remote units 714(1)-714(S) receive a plurality of uplink RF communications signals from the client devices through the antennas 716(1)-716(S). The remote units 714(1)-714(S) convert the uplink RF communications signals into a plurality of uplink digital communications signals 718U(1)-718U(S). Remote unit E/O converters are also provided in the remote units 714(1)-714(S) to convert the uplink digital communications signals 718U(1)-718U(S) into a plurality of uplink optical fiber-based communications signals 710U(1)-710U(S). The remote units 714(1)-714(S) communicate the uplink optical fiber-based communications signals 710U(1)-710U(S) over an uplink optical fiber-based communications medium 712U to the OIMs 708(1)-708(N) in the central unit 704. The OIMs 708(1)-708(N) include O/E converters that convert the received uplink optical fiber-based communications signals 710U(1)-710U(S) into a plurality of uplink digital communications signals 720U(1)-720U(S), which are processed by the RIMs 702(1)-702(M) and provided as the uplink digital communications signals 720U(1)-720U(S). The central unit 704 may provide the uplink digital communications signals 720U(1)-720U(S) to a base station or other communications system.

Note that the downlink optical fiber-based communications medium 712D and the uplink optical fiber-based communications medium 712U connected to each of the remote units 714(1)-714(S) may be a common optical fiber-based communications medium, wherein, for example, wave division multiplexing (WDM) is employed to provide the downlink optical fiber-based communications signals 710D(1)-710D(R) and the uplink optical fiber-based communications signals 710U(1)-710U(S) on the same optical fiber-based communications medium.

Figure 8:
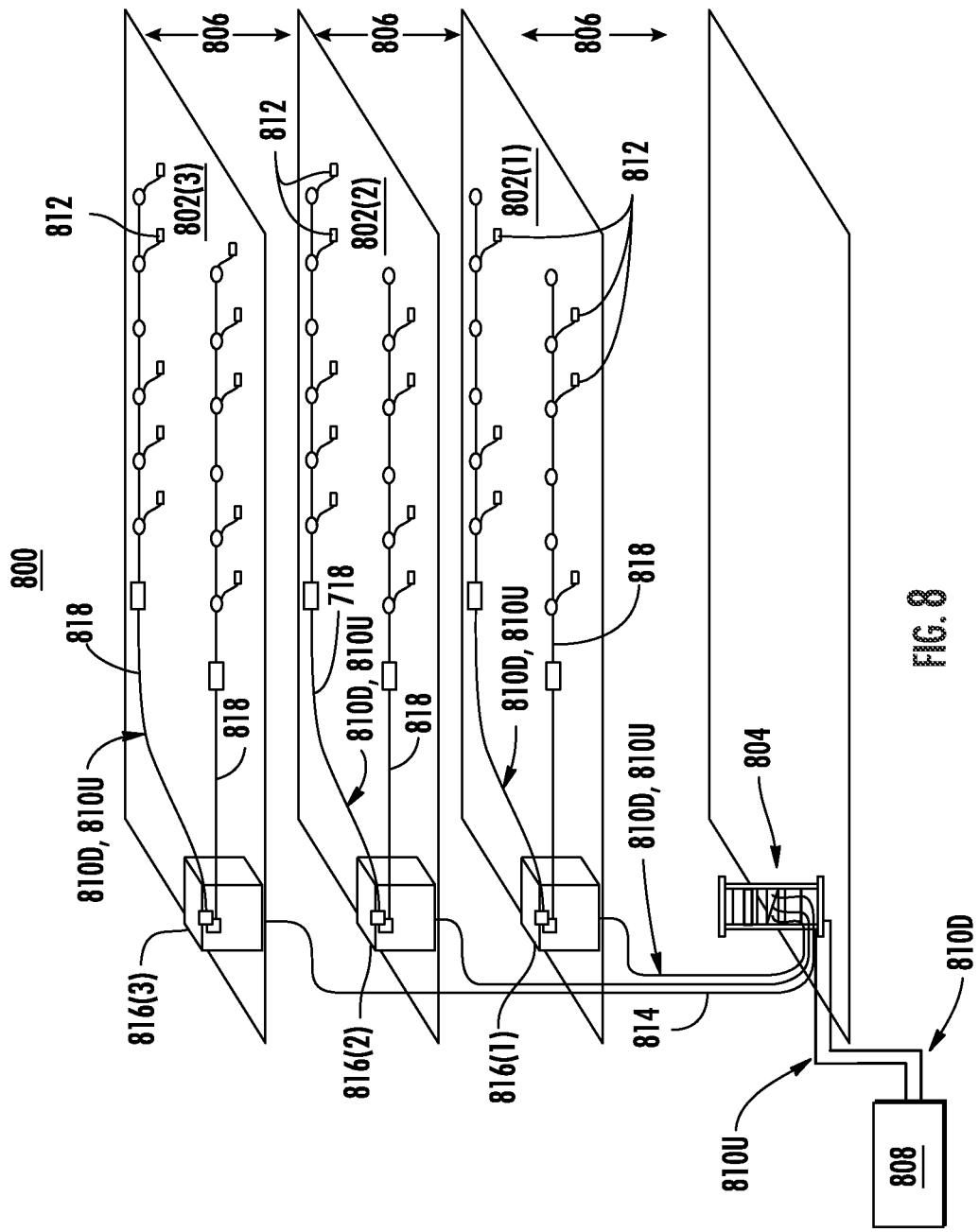
FIG. 8 is a schematic diagram of an exemplary building infrastructure with a deployed DCS, such as the optical fiber-based DAS in FIG. 7, according to any of the embodiments.

The WCS 700 in FIG. 7 can be provided in an indoor environment, as illustrated in FIG. 8. FIG. 8 is a partial schematic cut-away diagram of an exemplary building infrastructure 800 in a WCS, such as the WCS 300 of FIG. 3. The building infrastructure 800 in this embodiment includes a first (ground) floor 802(1), a second floor 802(2), and a third floor 802(3). The floors 802(1)-802(3) are serviced by a central unit 804 to provide antenna coverage areas 806 in the building infrastructure 800. The central unit 804 is communicatively coupled to a base station 808 to receive downlink communications signals 810D from the base station 808. The central unit 804 is communicatively coupled to a plurality of remote units 812 to distribute the downlink communications signals 810D to the remote units 812 and to receive uplink communications signals 810U from the remote units 812, as previously discussed above. The downlink communications signals 810D and the uplink communications signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the remote units 812 and also provide power to the remote units 812 via array cables 818.

Figure 9:
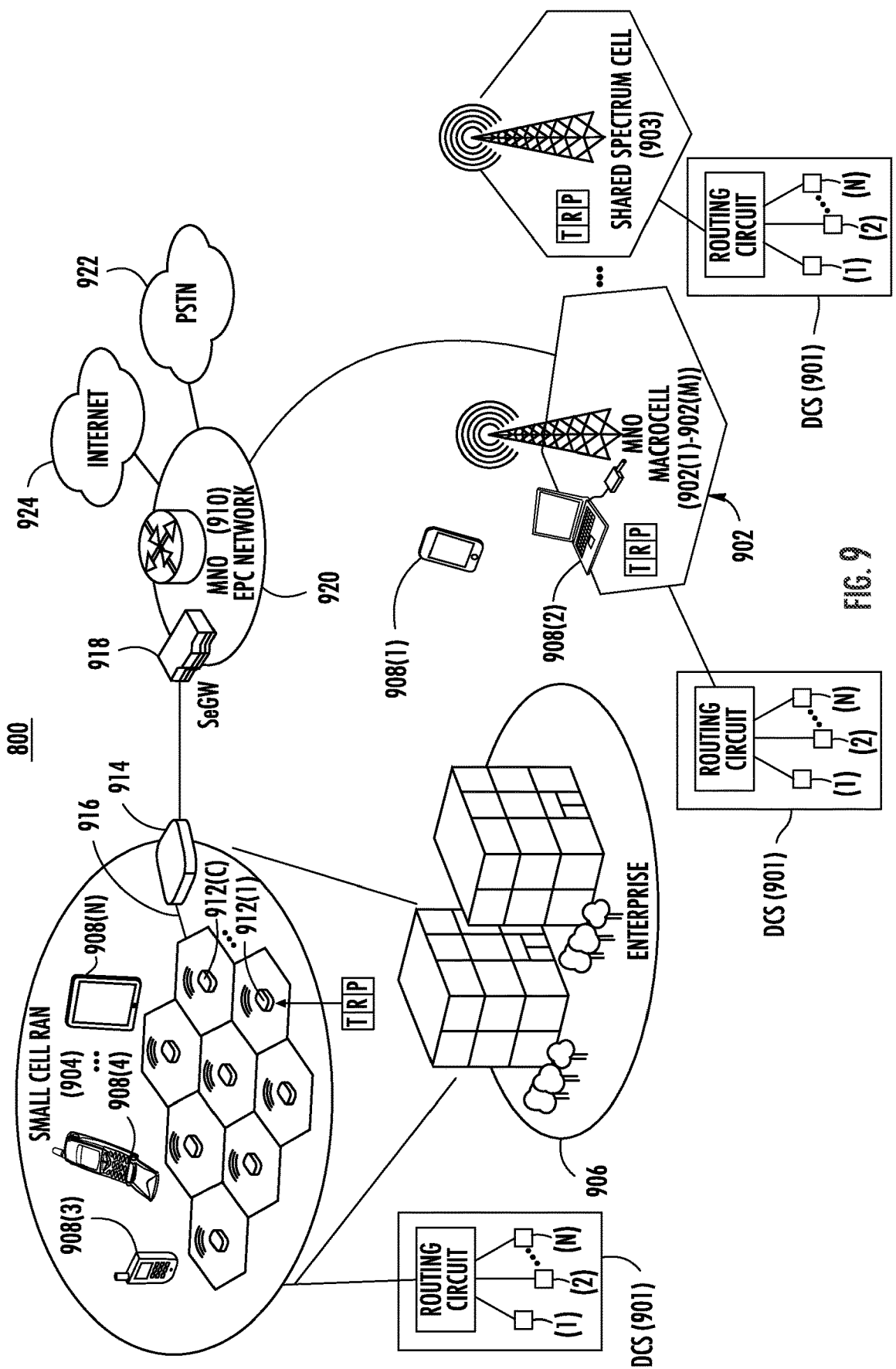
FIG. 9 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment, wherein any of the radio nodes can be configured to incorporate the adaptive TDD communications synchronization circuit according to any of the embodiments.

The WCS 700 of FIG. 7, which includes an adaptive TDD communications synchronization circuit, such as the TDD communications synchronization circuit 300 in FIG. 3, to support TDD synchronization according to the present embodiments, can also be interfaced with different types of radio nodes of service providers and/or supporting service providers, including macrocell systems, small cell systems, and remote radio heads (RRH) systems, as examples. For example, FIG. 9 is a schematic diagram of an exemplary mobile telecommunications environment 900 (also referred to as "environment 900") that includes radio nodes and cells that may support shared spectrum, such as unlicensed spectrum, and can be interfaced to shared spectrum WCSs 901 supporting coordination of distribution of shared spectrum from multiple service providers to remote units to be distributed to subscriber devices. The shared spectrum WCSs 901 can include the WCS 300 of FIG. 3 that includes the wireless device 600 of FIG. 6A, as an example.

The environment 900 includes exemplary macrocell RANs 902(1)-902(M) ("macrocells 902(1)-902(M)"), and an exemplary small cell RAN 904 located within an enterprise environment 906 and configured to service mobile communications between a user mobile communications device 908(1)-908(N) to a mobile network operator (MNO) 910. A serving RAN for the user mobile communications devices 908(1)-908(N) is a RAN or cell in the RAN in which the user mobile communications devices 908(1)-908(N) have an established communications session with the exchange of mobile communications signals for mobile communications. Thus, a serving RAN may also be referred to herein as a serving cell. For example, the user mobile communications devices 908(3)-908(N) in FIG. 9 are being serviced by the small cell RAN 904, whereas the user mobile communications devices 908(1) and 908(2) are being serviced by the macrocell 902. The macrocell 902 is an MNO macrocell in this example. However, a shared spectrum RAN 903 (also referred to as "shared spectrum cell 903") includes a macrocell in this example and supports communications on frequencies that are not solely licensed to a particular MNO, such as CBRS for example, and thus may service user mobile communications devices 908(1)-908(N) independent of a particular MNO. For example, the shared spectrum cell 903 may be operated by a third party that is not an MNO and wherein the shared spectrum cell 903 supports CBRS. Also, as shown in FIG. 9, the MNO macrocell 902, the shared spectrum cell 903, and/or the small cell RAN 904 can interface with a shared spectrum WCS 901, supporting coordination of distribution of shared spectrum from multiple service providers to remote units to be distributed to subscriber devices. The MNO macrocell 902, the shared spectrum cell 903, and the small cell RAN 904 may be neighboring radio access systems to each other, meaning that some or all can be in proximity to each other such that a user mobile communications device 908(3)-908(N) may be able to be in communications range of two or more of the MNO macrocell 902, the shared spectrum cell 903, and the small cell RAN 904 depending on the location of the user mobile communications devices 908(3)-908(N).

In FIG. 9, the mobile telecommunications environment 900 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 900 includes the enterprise environment 906 in which the small cell RAN 904 is implemented. The small cell RAN 904 includes a plurality of small cell radio nodes 912(1)-912(C). Each small cell radio node 912(1)-912(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 9, the small cell RAN 904 includes one or more services nodes (represented as a single services node 914) that manage and control the small cell radio nodes 912(1)-912(C). In alternative implementations, the management and control functionality may be incorporated into a radio node, distributed among nodes, or implemented remotely (i.e., using infrastructure external to the small cell RAN 904). The small cell radio nodes 912(1)-912(C) are coupled to the services node 914 over a direct or local area network (LAN) connection 916 as an example, typically using secure IPsec tunnels. The small cell radio nodes 912(1)-912(C) can include multi-operator radio nodes. The services node 914 aggregates voice and data traffic from the small cell radio nodes 912(1)-912(C) and provides connectivity over an IPsec tunnel to a security gateway (SeGW) 918 in a network 920 (e.g., evolved packet core (EPC) network in a 4G network, or 5G Core in a 5G network) of the MNO 910. The network 920 is typically configured to communicate with a public switched telephone network (PSTN) 922 to carry circuit-switched traffic, as well as for communicating with an external packet-switched network such as the Internet 924.

The environment 900 also generally includes a node (e.g., eNodeB or gNodeB) base station or "macrocell" 902. The radio coverage area of the macrocell 902 is typically much larger than that of a small cell, where the extent of coverage often depends on the base station configuration and surrounding geography. Thus, a given user mobile communications device 908(3)-908(N) may achieve connectivity to the network 920 (e.g., EPC network in a 4G network, or 5G Core in a 5G network) through either a macrocell 902 or small cell radio node 912(1)-912(C) in the small cell RAN 904 in the environment 900.

Figure 10:
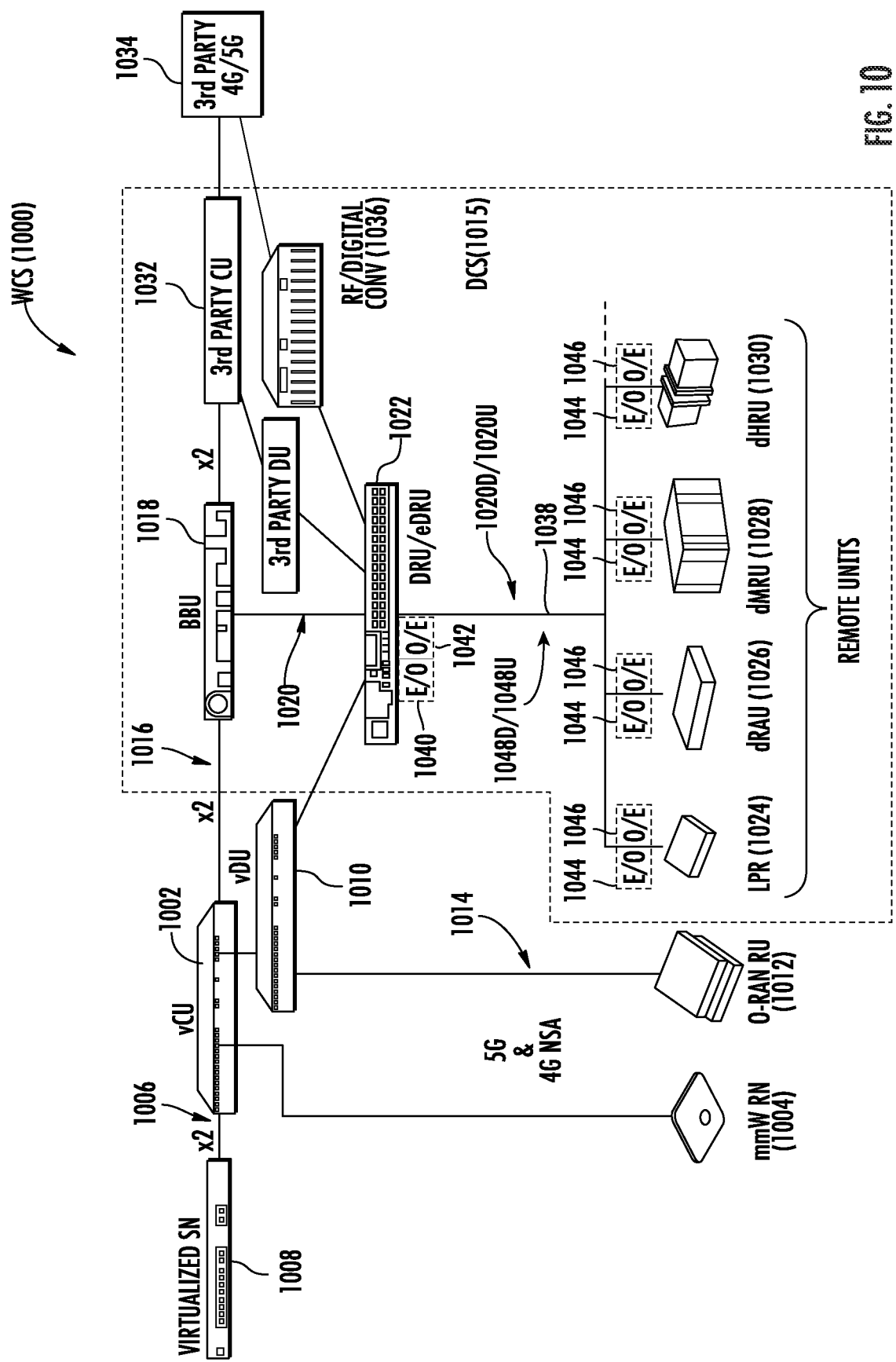
FIG. 10 is a schematic diagram of an exemplary distributed communications system that supports 4G and 5G communications services, and wherein any of the radio nodes can be configured to support adaptive TDD communications synchronization circuit according to any of the embodiments.

FIG. 10 is a schematic diagram of another exemplary DCS 1000 that supports 4G and 5G communications services, and wherein any of the radio nodes can be configured to include an adaptive TDD communications synchronization circuit, including the TDD communications synchronization circuit 300 in FIG. 3, to support TDD synchronization according to the present embodiments. The DCS 1000 supports both legacy 4G LTE, 4G/5G non-standalone (NSA), and 5G communications systems. The WCS 300 supports both legacy 4G LTE, 4G/5G non-standalone (NSA), and 5G standalone communications systems. As shown in FIG. 10, a centralized services node 1002 is provided that is configured to interface with a core network to exchange communications data and distribute the communications data as radio signals to remote units. In this example, the centralized services node 1002 is configured to support distributed communications services to an mmWave radio node 1004. Despite that only one of the mmWave radio node 1004 is shown in FIG. 10, it should be appreciated that the WCS 1000 can be configured to include additional numbers of the mmWave radio node 1004, as needed. The functions of the centralized services node 1002 can be virtualized through an x2 interface 1006 to another services node 1008. The centralized services node 1002 can also include one or more internal radio nodes that are configured to be interfaced with a distribution unit (DU) 1010 to distribute communications signals to one or more open radio access network (O-RAN) remote units (RUs) 1012 that are configured to be communicatively coupled through an O-RAN interface 1014. The O-RAN RUs 1012 are each configured to communicate downlink and uplink communications signals in a respective coverage cell.

The centralized services node 1002 can also be interfaced with a distributed communications system (DCS) 1015 through an x2 interface 1016. Specifically, the centralized services node 1002 can be interfaced with a digital baseband unit (BBU) 1018 that can provide a digital signal source to the centralized services node 1002. The digital BBU 1018 may be configured to provide a signal source to the centralized services node 1002 to provide downlink communications signals 1020D to a digital routing unit (DRU) 1022 as part of a digital distributed antenna system (DAS). The DRU 1022 is configured to split and distribute the downlink communications signals 1020D to different types of remote units, including a low-power remote unit (LPR) 1024, a radio antenna unit (dRAU) 1026, a mid-power remote unit (dMRU) 1028, and a high-power remote unit (dHRU) 1030. The DRU 1022 is also configured to combine uplink communications signals 1020U received from the LPR 1024, the dRAU 1026, the dMRU 1028, and the dHRU 1030 and provide the combined uplink communications signals to the digital BBU 1018. The digital BBU 1018 is also configured to interface with a third-party central unit 1032 and/or an analog source 1034 through a radio frequency (RF)/digital converter 1036.

The DRU 1022 may be coupled to the LPR 1024, the dRAU 1026, the dMRU 1028, and the dHRU 1030 via an optical fiber-based communications medium 1038. In this regard, the DRU 1022 can include a respective electrical-to-optical (E/O) converter 1040 and a respective optical-to-electrical (O/E) converter 1042. Likewise, each of the LPR 1024, the dRAU 1026, the dMRU 1028, and the dHRU 1030 can include a respective E/O converter 1044 and a respective O/E converter 1046.

The E/O converter 1040 at the DRU 1022 is configured to convert the downlink communications signals 1020D into downlink optical communications signals 1048D for distribution to the LPR 1024, the dRAU 1026, the dMRU 1028, and the dHRU 1030 via the optical fiber-based communications medium 1038. The O/E converter 1046 at each of the LPR 1024, the dRAU 1026, the dMRU 1028, and the dHRU 1030 is configured to convert the downlink optical communications signals 1048D back to the downlink communications signals 1020D. The E/O converter 1044 at each of the LPR 1024, the dRAU 1026, the dMRU 1028, and the dHRU 1030 is configured to convert the uplink communications signals 1020U into uplink optical communications signals 1048U. The O/E converter 1042 at the DRU 1022 is configured to convert the uplink optical communications signals 1048U back to the uplink communications signals 1020U. The mmWave radio node 1004, the O-RAN RU 1012, the LPR 1024, the dRAU 1026, the dMRU 1028, and the dHRU 1030 may each include an antenna array to form the RF beams 200 in FIG. 2A. For the convenience of reference, the mmWave radio node 1004, the O-RAN RU 1012, the LPR 1024, the dRAU 1026, the dMRU 1028, and the dHRU 1030 are collectively referred to as a wireless device.

Figure 11:
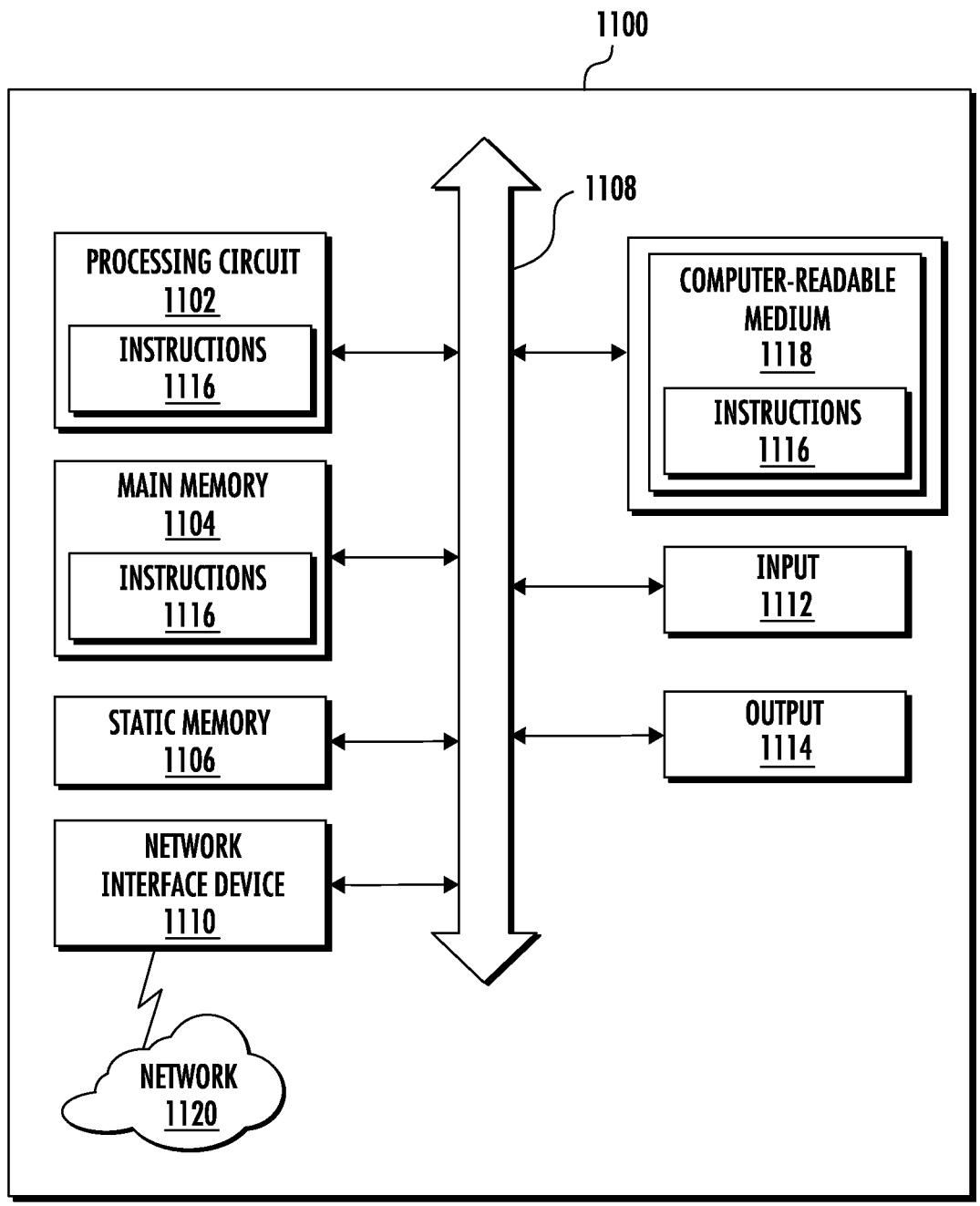
FIG. 11 is a schematic diagram of a representation of an exemplary computer system that can be included in or interface with any of the components in the wireless communications circuits in any of the aforementioned figures, wherein the exemplary computer system can be provided in adaptive TDD communications synchronization circuit or any circuits therein, wherein the computer system configured to execute instructions from an exemplary computer-readable medium, according to any of the embodiments.

Any of the circuits in the wireless communications systems herein an include a computer system 1100, such as shown in FIG. 11, to support TDD synchronization according to the present embodiments. The computer system 1100 may be used as or included in a that an adaptive TDD communications synchronization circuit, including the TDD communications synchronization circuit 300 in FIG. 3, to support TDD synchronization according to the present embodiments. With reference to FIG. 11, the computer system 1100 includes a set of instructions for causing the multi-operator radio node component(s) to provide its designed functionality and their circuits discussed above. The multi-operator radio node component(s) may be connected (e.g., networked) to other machines in a LAN, an intranet, an extranet, or the Internet. The multi-operator radio node component(s) may operate in a client-server network environment or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1100 in this embodiment includes a processing circuit or processor 1102, a main memory 1104 (e.g., read-only memory (ROM), flash memory, dynamic random access memory (DRAM) such as synchronous DRAM (SDRAM), etc.), and a static memory 1106 (e.g., flash memory, static random access memory (SRAM), etc.), which may communicate with each other via a data bus 1108. Alternatively, the processing circuit 1102 may be connected to the main memory 1104 and/or static memory 1106 directly or via some other connectivity means. The processing circuit 1102 may be a controller, and the main memory 1104 or static memory 1106 may be any type of memory.

The processing circuit 1102 represents one or more general-purpose processing circuits such as a microprocessor, central processing unit, or the like. More particularly, the processing circuit 1102 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1102 is configured to execute processing logic in instructions 1116 for performing the operations and steps discussed herein.

The computer system 1100 may further include a network interface device 1110. The computer system 1100 also may or may not include an input 1112 to receive input and selections to be communicated to the computer system 1100 when executing instructions. The computer system 1100 also may or may not include an output 1114, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1100 may or may not include a data storage device that includes instructions 1116 stored in a computer-readable medium 1118. The instructions 1116 may also reside, completely or at least partially, within the main memory 1104 and/or within the processing circuit 1102 during execution thereof by the computer system 1100, the main memory 1104, and the processing circuit 1102 also constituting computer-readable medium. The instructions 1116 may further be transmitted or received over a network 1120 via the network interface device 1110.

While the computer-readable medium 1118 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product or software that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read-only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware and may reside, for example, in Random Access Memory (RAM), flash memory, Read-Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that any particular order be inferred. It will be apparent to those skilled in the art that various modifications and variations can be made without departing from the spirit or scope of the invention. Since modifications combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. An adaptive time-division duplexed (TDD) communications synchronization circuit, comprising:
    a power detector circuit configured to:
        receive a TDD downlink communications signal formatted for a TDD communication frame comprising a TDD downlink time period and a TDD uplink time period on a TDD downlink communications link;
        detect a noise signal level on the TDD downlink communications link over a defined duration of the TDD communication frame that covers at least a portion of the TDD uplink time period;
        set a noise threshold floor level for the TDD downlink communications link based on the detected noise signal level in the TDD uplink time period of the TDD communication frame;
        detect the TDD downlink communications signal exceeding the noise threshold floor level; and
        detect the TDD downlink time period in the TDD communication frame based on the detect the TDD downlink communications signal exceeding the noise threshold floor level; and
    a downlink/uplink switch circuit coupled to an input/output node, the downlink downlink/uplink switch circuit configured to pass the detected TDD downlink communications signal to the input/output node during the detected TDD downlink time period.

2. The adaptive TDD communications synchronization circuit of claim 1, wherein the power detection circuit further comprises an envelope detector circuit coupled to the TDD downlink communications link, the envelope detector circuit configured to demodulate the received TDD downlink communications signal.

3. The adaptive TDD communications synchronization circuit of claim 1, wherein the envelope detector circuit is configured to demodulate the received TDD downlink communications signal to generate a binary sequence representing the received TDD downlink communications signal.

4. The adaptive TDD communications synchronization circuit of claim 1, wherein the power detection circuit further comprises a sampling circuit configured to sample the demodulated TDD downlink communications signal.

5. The adaptive TDD communications synchronization circuit of claim 1, wherein the power detection circuit further comprises a threshold calculation circuit configured to set the noise threshold floor level for the TDD downlink communications link based on the detected noise signal level in the TDD uplink time period of the TDD communication frame.

6. The adaptive TDD communications synchronization circuit of claim 1, wherein the power detection circuit further comprises a comparator circuit configured to detect the TDD downlink communications signal exceeding the noise threshold floor level and pass the detected TDD downlink communications signal exceeding the noise threshold floor level to the symbol edge detection circuit.

7. The adaptive TDD communications synchronization circuit of claim 5, wherein the power detection circuit further comprises a down sampling circuit configured to down sample the TDD downlink communications signal to be provided to the threshold calculation circuit.

8. The adaptive TDD communications synchronization circuit of claim 1, further configured to:
set the downlink/uplink switch circuit to downlink for the detected duration of the TDD downlink time period in a new TDD communication frame of the received TDD downlink communications signal.

9. The adaptive TDD communications synchronization circuit of claim 1, wherein the power detection circuit is configured to set the noise threshold floor level for the TDD downlink communications link based on the detected noise signal level in the TDD uplink time period of the TDD communication frame, by being configured to:
find a local maximum of M samples of the TDD downlink communications signal, and set the noise threshold floor level to a minimum along the local maximums of M samples.

10. The adaptive TDD communications synchronization circuit of claim 1, further comprising a symbol edge detected circuit configured to:
detect a TDD symbol edge in the detected TDD downlink communications signal; and
generate a symbol edge trigger signal indicating the TDD symbol edges in the detected TDD downlink communications signal.

11. The adaptive TDD communications synchronization circuit of claim 1, wherein the symbol edge detected circuit comprises a symbol counter circuit configured to count detected TDD symbols in the detected TDD downlink communications signal;
wherein the symbol edge detected circuit is configured to detect a TDD symbol edge in the detected TDD downlink communications signal based on a comparison of the counted TDD symbols.

12. The adaptive TDD communications synchronization circuit of claim 1, wherein the symbol edge detected circuit further comprises an alignment circuit configured to generate an alignment signal based on the detected TDD symbols to the symbol edge trigger circuit to control the generate of the symbol edge trigger signal.

13. The adaptive TDD communications synchronization circuit of claim 11, wherein the symbol edge detected circuit is configured to detect a TDD symbol edge in the detected TDD downlink communications signal based on the majority detection of the detected TDD downlink communications signal.

14. The adaptive TDD communications synchronization circuit of claim 10, further comprising a TDD frame configuration build circuit configured to:
receive the detected TDD downlink communications signal;
generate downlink/uplink input markers based on the detected TDD downlink communications signal;
generate downlink/uplink output markers for a detected TDD frame configuration based on the downlink/uplink input markers;
control the downlink/uplink switch circuit to pass the detected TDD downlink communications signal to the input/output node based on the TDD downlink time period in the detected TDD frame configuration.

15. The adaptive TDD communications synchronization circuit of claim 10, wherein:
the power detection circuit further comprises a sampling circuit configured to sample the demodulated TDD downlink communications signal at a first sampling rate to provide the detected TDD downlink communications signal;
the symbol edge detection circuit is configured to sample the detected TDD downlink communications signal at a second sampling rate higher than the first sampling rate to detect the TDD symbol edge in the detected TDD downlink communications.

16. A method of synchronizing time-division duplexed (TDD) downlink and uplink communications in a distributed communications system (DCS), comprising:
receiving a TDD downlink communications signal formatted for a TDD communication frame comprising a TDD downlink time period and a TDD uplink time period on a TDD downlink communications link;
detecting a noise signal level on the TDD downlink communications link over a defined duration of the TDD communication frame that covers at least a portion of the TDD uplink time period;
setting a noise threshold floor level for the TDD downlink communications link based on the detected noise signal level in the TDD uplink time period of the TDD communication frame;
detecting the TDD downlink communications signal exceeding the noise threshold floor level; and
detecting the TDD downlink time period in the TDD communication frame based on the detect the TDD downlink communications signal exceeding the noise threshold floor level; and
passing the detected TDD downlink communications signal exceeding the noise threshold floor level to an input/output node during the detected TDD downlink time period.

17. The method of claim 16, further comprising demodulating the received TDD downlink communications signal.

18. The method of claim 16, further comprising sample the demodulated TDD downlink communications signal.

19. The method of claim 16, comprising setting the noise threshold floor level for the TDD downlink communications link based on the detected noise signal level in the TDD uplink time period of the TDD communication frame.

20. The method of claim 16, further comprising detecting the TDD downlink communications signal exceeding the noise threshold floor level and pass the detected TDD downlink communications signal exceeding the noise threshold floor level to the symbol edge detection circuit.

21. The method of claim 16, further comprising:
Detecting a TDD symbol edge in the detected TDD downlink communications signal; and
generating a symbol edge trigger signal indicating the TDD symbol edges in the detected TDD downlink communications signal.

22. The method of claim 21, further comprising:
receiving the detected TDD downlink communications signal;
generating downlink/uplink input markers based on the detected TDD downlink communications signal;
generating downlink/uplink output markers for a detected TDD frame configuration based on the downlink/uplink input markers;
controlling the downlink/uplink switch circuit to pass the detected TDD downlink communications signal to the input/output node based on the TDD downlink time period in the detected TDD frame configuration.

23. A distributed communicated system (DCS), comprising:
a central unit configured to:
receive TDD downlink communications signals from a TDD signal source;
distribute the received TDD downlink communications signals over at least one TDD downlink communications link to at least one remote unit among a plurality of remote units;
receive TDD uplink communications signals over a plurality of TDD uplink communications links from the plurality of remote units; and
distribute the received TDD uplink communications signals to TDD signal source;
the plurality of remote units each configured to:
receive the TDD downlink communications signals over a TDD downlink communications link among the at least one TDD downlink communications link
distribute the received TDD downlink communications signals to a user device;
receive TDD uplink communications signals from a user device
distribute the receive TDD uplink communications signals over a TDD uplink communications link among the plurality of TDD uplink communication to the central unit;
at least one remote unit among the plurality of remote units, comprising:
an adaptive time-division duplexed (TDD) communications synchronization circuit, comprising:
a power detector circuit configured to:
receive a TDD downlink communications signal formatted for a TDD communication frame comprising a TDD downlink time period and a TDD uplink time period on a TDD downlink communications link;
detect a noise signal level on the TDD downlink communications link over a defined duration of the TDD communication frame that covers at least a portion of the TDD uplink time period;
set a noise threshold floor level for the TDD downlink communications link based on the detected noise signal level in the TDD uplink time period of the TDD communication frame;
detect the TDD downlink communications signal exceeding the noise threshold floor level; and
detect the TDD downlink time period in the TDD communication frame based on the detect the TDD downlink communications signal exceeding the noise threshold floor level; and
a downlink/uplink switch circuit coupled to an input/output node, the downlink downlink/uplink switch circuit configured to pass the detected TDD downlink communications signal to the input/output node during the detected TDD downlink time period.

24. The DCS of claim 23, wherein:
the central unit comprises:
an electrical-to-optical (E/O) converter configured to convert the TDD downlink communications signals into TDD downlink optical communications signals; and
an optical-to-electrical (O/E) converter configured to convert the TDD uplink optical communications signals into the TDD uplink communications signals; and
the plurality of remote units each comprise:
an O/E converter configured to convert a respective one of TDD downlink optical communications signals into a respective one of the TDD downlink communications signals; and
an E/O converter configured to convert a respective one of the TDD uplink communications signals into a respective one of the TDD uplink optical communications signals.

25. The DCS of claim 23, wherein the adaptive TDD communications synchronization circuit further comprises a symbol edge detected circuit configured to:
detect a TDD symbol edge in the detected TDD downlink communications signal; and
generate a symbol edge trigger signal indicating the TDD symbol edges in the detected TDD downlink communications signal.

26. The DCS of claim 25, wherein the adaptive TDD communications synchronization circuit further comprises a TDD frame configuration build circuit configured to:
receive the detected TDD downlink communications signal;
generate downlink/uplink input markers based on the detected TDD downlink communications signal;
generate downlink/uplink output markers for a detected TDD frame configuration based on the downlink/uplink input markers;
control the downlink/uplink switch circuit to pass the detected TDD downlink communications signal to the input/output node based on the TDD downlink time period in the detected TDD frame configuration.

* * * * *